(12) United States Patent
Yamaoka et al.

(10) Patent No.: US 10,467,519 B2
(45) Date of Patent: Nov. 5, 2019

(54) IC TAG LABEL

(71) Applicant: TOPPAN PRINTING CO., LTD., Tokyo (JP)

(72) Inventors: Keinosuke Yamaoka, Tokyo (JP); Takamitsu Nakabayashi, Tokyo (JP); Shosei Asaka, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/379,428

(22) Filed: Apr. 9, 2019

(65) Prior Publication Data

US 2019/0236430 A1 Aug. 1, 2019

Related U.S. Application Data

(63) Continuation of application No. PCT/JP2017/044413, filed on Dec. 11, 2017.

(30) Foreign Application Priority Data

Dec. 15, 2016 (JP) .................. 2016-243727
Dec. 15, 2016 (JP) .................. 2016-243728
Dec. 21, 2016 (JP) .................. 2016-247771

(51) Int. Cl.
   *G06K 19/077* (2006.01)
   *B65D 23/00* (2006.01)
   (Continued)

(52) U.S. Cl.
   CPC ....... *G06K 19/07758* (2013.01); *B65D 23/00* (2013.01); *B65D 23/14* (2013.01);
   (Continued)

(58) Field of Classification Search
   CPC ....... G06K 19/07758; G06K 19/07773; B65D 55/02; B65D 23/14; H01Q 1/00; H01Q 1/2208; H01Q 1/2283
   See application file for complete search history.

(56) References Cited

U.S. PATENT DOCUMENTS

2008/0272916 A1   11/2008 Breysse et al.
2017/0183135 A1*  6/2017 Pic .................. B65D 55/06

FOREIGN PATENT DOCUMENTS

JP        3105286 U      10/2004
JP        2014-005032 A   1/2014
(Continued)

OTHER PUBLICATIONS

International Searching Authority, "International Search Report," issued in connection with International Patent Application No. PCT/JP2017/044413, dated Feb. 27, 2018.
(Continued)

*Primary Examiner* — Laura A Gudorf
(74) *Attorney, Agent, or Firm* — Foley & Lardner LLP

(57) ABSTRACT

An IC tag label includes: an IC chip; a communication antenna element having a first end and a second end, the first end being electrically connected to the IC chip, the communication antenna element including a planar coil extending on a first surface and having a shape suitable for positioning on a bottle mouth; and a bridge wiring including a wiring element which is located in an opposed region on a second surface which is opposed to the first surface, the bridge wiring electrically connecting the second end to the IC chip. The communication antenna element has an air core section which includes a center of the planar coil, and the wiring element is a single wire including a plurality of bent
(Continued)

sections and having a folded line shape which traverses the air core section a plurality of times in plan view perpendicular to the first surface.

12 Claims, 12 Drawing Sheets

(51) Int. Cl.
*H01Q 1/22* (2006.01)
*B65D 55/02* (2006.01)
*B65D 23/14* (2006.01)
*H01Q 7/00* (2006.01)
*B65D 25/20* (2006.01)
*G06K 19/04* (2006.01)

(52) U.S. Cl.
CPC .............. *B65D 25/20* (2013.01); *B65D 55/02* (2013.01); *G06K 19/04* (2013.01); *G06K 19/077* (2013.01); *G06K 19/07773* (2013.01); *H01Q 1/2208* (2013.01); *H01Q 1/2283* (2013.01); *H01Q 7/00* (2013.01)

(56) References Cited

FOREIGN PATENT DOCUMENTS

WO   WO-2006/016559 A1   2/2006
WO   WO-2016/116672 A1   7/2016

OTHER PUBLICATIONS

International Searching Authority, "Written Opinion," issued in connection with International Patent Application No. PCT/JP2017/044413, dated Feb. 27, 2018.

\* cited by examiner

IC TAG LABEL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/044413, filed on Dec. 11, 2017, which is based upon and claims the benefit of priority to Japanese Patent Application No. 2016-243727, filed on Dec. 15, 2016; Japanese Patent Application No. 2016-243728, filed on Dec. 15, 2016; and Japanese Patent Application No. 2016-247771, filed on Dec. 21, 2016; the disclosures of which are all incorporated herein by reference in their entireties.

TECHNICAL FIELD

The present invention relates to an IC tag label attached to a bottle in which a liquid, such as a beverage, is stored.

BACKGROUND ART

IC tag labels are used to determine whether the liquid stored in a bottle is a genuine liquid which should be stored in the bottle or counterfeit liquid that is different from the genuine liquid. In a capped bottle having a bottle main body for storing liquid and a cap for closing a mouth of the bottle main body, an IC tag label is attached extending from a side surface of the cap to a side surface of a neck, which is a portion of an outer surface of the bottle main body, which is continuous from the side surface of the cap. Accordingly, an antenna included in the IC tag label extends from the side surface of the cap to the side surface of the neck.

When the cap of the bottle is opened, the antenna is broken by a force applied to an interface between the cap and the neck. This causes the IC tag label to become unable to communicate with a reader. Accordingly, it is possible to recognize that the cap of the bottle has been opened. If the cap of the bottle has been opened, there is a high probability that a genuine liquid stored in the bottle has been replaced with a counterfeit liquid. Accordingly, on the basis of the state of the IC tag label, it is possible to determine whether the liquid stored in the bottle is a genuine liquid or not (for example, see PTL 1).

CITATION LIST

[Patent Literature] PTL 1: WO 2006/016559-A1

SUMMARY OF THE INVENTION

Technical Problem

In some cases, a genuine liquid stored in a bottle may also be replaced with a counterfeit liquid by removing the genuine liquid from the bottle main body and injecting counterfeit liquid into the bottle main body without opening the cap of the bottle. For example, a through hole that is hard to detect may be formed in the cap at a position facing the bottle mouth of the bottle main body so that liquid is removed or added via the through hole. In such a case, it is impossible to determine on the basis of the state of the IC tag label whether the liquid stored in the bottle is a genuine liquid or not. For this reason, there is a demand for IC tag labels that can be used to determine whether a liquid has been removed or added to a bottle without opening a cap.

An object of the present invention is to provide an IC tag label that can be used to determine whether liquid has been removed or added to a bottle without opening a cap.

Improvement or Solution to Problem

An IC tag label for solving the above problem includes: an IC chip; a communication antenna element having a first end and a second end, the first end being electrically connected to the IC chip, the communication antenna element including a planar coil extending on a first surface and having a shape suitable for positioning on a bottle mouth; and a bridge wiring including a wiring element which is located in an opposed region on a second surface which is opposed to the first surface, the bridge wiring electrically connecting the second end to the IC chip, wherein the communication antenna element has an air core section which includes a center of the planar coil, and the wiring element is a single wire including a plurality of bent sections and having a folded line shape which traverses the air core section a plurality of times in plan view perpendicular to the first surface.

An IC tag label for solving the above problem includes: an IC chip; a communication antenna element having a first end and a second end, the first end being electrically connected to the IC chip, the communication antenna element including a planar coil extending on a first surface and having a shape suitable for positioning on a bottle mouth; and a bridge wiring including a wiring element which is located in an opposed region on a second surface which is opposed to the first surface, the bridge wiring electrically connecting the second end to the IC chip, wherein the communication antenna element has an air core section which includes a center of the planar coil, and the wiring element is a single wire having a spiral shape overlapped with the air core section in plan view perpendicular to the first surface.

With this configuration, the single wire is located in the air core section defined by the planar coil in plan view perpendicular to the first surface. Accordingly, when a needle is pierced into the cap closing the bottle mouth, a wire break caused by the needle is likely to occur in part of the single wire. As a result, the IC tag label becomes unable to communicate with a reader.

Therefore, it is possible to recognize on the basis of the state of the IC tag label that the bottle storing liquid has been tampered with, for example, by which genuine liquid has been replaced with counterfeit liquid. That is, the IC tag label can be used to determine whether liquid has been removed or added to a bottle without opening the bottle.

In the IC tag label, the planar coil includes an annular section that defines the air core section, and a first linear section, the wiring element is a second wiring element, and the bridge wiring further includes a first wiring element located on the first surface and electrically connected to the second wiring element, the first wiring element including a second linear section, and the first linear section and the second linear section extend outward in a radial direction of the annular section from different positions in a circumferential direction of the annular section and may be located on a single straight line in plan view perpendicular to the first surface.

With this configuration, when the planar coil is attached to the bottle mouth, the first linear section and the second linear section can extend along the neck, and thus a distance between the first linear section and the second linear section in the circumferential direction of the annular section becomes a maximum. Accordingly, compared with a configuration in which the second linear section is located adjacent to the first linear section in the circumferential direction of the annular section, it is possible to reduce occurrence of a situation where a wire break does not occur in either of the first linear section and the second linear section when the bottle is manipulated in the circumferential direction of the bottle neck.

In the above IC tag label, the planar coil may include an annular section that defines the air core section, and the planar coil may have a size such that, when positioned on the bottle mouth, one-half or more of a circumferential length of the annular section is located inside an outer rim of the bottle mouth in plan view perpendicular to the first surface.

With this configuration, compared with a configuration in which most of the annular section protrudes from the outer rim of the bottle mouth, the annular section can be prevented from being deformed by an external force applied to the annular section when the IC tag label is attached to the bottle mouth.

In the above IC tag label, the IC chip may be located inside an outer rim of the bottle mouth on the first surface when the planar coil is positioned on the bottle mouth, the wiring element may be a second wiring element, the bridge wiring may further include a first wiring element located on the first surface and including a third end electrically connected to the IC chip and a fourth end electrically connected to the second wiring element, the second end may have a maximum line width in the planar coil, the fourth end may have a maximum line width in the first wiring element, and, when the planar coil is positioned on the bottle mouth, the second end and the fourth end may be located between an inner rim and an outer rim of the bottle mouth in plan view perpendicular to the first surface.

When the second end and the fourth end are located inside the inner rim of the bottle mouth and a needle is pierced into one of the ends, a probability that the IC chip can still perform communication via the communication antenna increases, compared with a case where a needle is pierced into the planar coil at a position other than the second end or a needle is pierced into the first wiring element at a position other than the fourth end. In this regard, according to the above configuration in which the second end and the fourth end are located outside the inner rim of the bottle mouth, a probability that a needle, when pierced into the cap, pierces the single wire, increases. As a result, a probability that the IC chip becomes unable to communicate via the communication antenna increases.

An IC tag label for solving the above problem includes an IC chip; a communication antenna element having a first end and a second end, the first end being electrically connected to the IC chip, the communication antenna element including a planar coil extending on a first surface and having a shape suitable for positioning on a bottle mouth; and a bridge wiring electrically connecting the second end to the IC chip; and a wire break detection circuit including a detection element located outside the planar coil in plan view perpendicular to the first surface, and electrically connected to the IC chip, the detection element having a shape suitable for positioning on the bottle neck, wherein the communication antenna element has an air core section which includes a center of the planar coil, one of the bridge wiring and the wire break detection circuit includes a single wire, the single wire includes a plurality of bent sections and having a folded line shape which traverses the air core section a plurality of times in plan view perpendicular to the first surface, the single wire is located on an opposed region on a second surface which is opposed to the first surface when the bridge wiring includes the single wire, and the single wire is located on one of the first surface and the opposed region when the wire break detection circuit includes the single wire.

An IC tag label for solving the above problem includes an IC chip; a communication antenna element having a first end and a second end, the first end being electrically connected to the IC chip, the communication antenna including a planar coil extending on a first surface and having a shape suitable for positioning on a bottle mouth; and a bridge wiring electrically connecting the second end to the IC chip; and a wire break detection circuit including a detection element located outside the planar coil in plan view perpendicular to the first surface, and electrically connected to the IC chip, the detection element having a shape suitable for positioning on the bottle neck, wherein the communication antenna element has an air core section which includes a center of the planar coil, one of the bridge wiring and the wire break detection circuit includes a single wire, the single wire has a spiral shape overlapped with the air core section in plan view perpendicular to the first surface, the single wire is located on an opposed region on a second surface which is opposed to the first surface when the bridge wiring includes the single wire, and the single wire is located on one of the first surface and the opposed region when the wire break detection circuit includes the single wire.

With this configuration, the single wire is located in the air core section defined by the planar coil in plan view perpendicular to the first surface. Accordingly, when a needle is pierced into the cap closing the bottle mouth, a wire break caused by the needle is likely to occur in part of the single wire. As a result, the IC chip becomes unable to communicate with a reader, or the IC chip detects a wire break in the wire break detection circuit.

Therefore, it is possible to recognize on the basis of the state of the IC tag label that the bottle storing liquid has been tampered with, for example, by which genuine liquid has been replaced with counterfeit liquid. That is, the IC tag label can be used to determine whether liquid has been removed or added to a bottle without opening the bottle.

In the above IC tag label, at least part of the plurality of bent sections may be located outside the air core section.

With this configuration, a portion of the single wire connected to the bent sections which are located outside the air core section extends outside the edge of the air core section. Accordingly, a region in which the single wire is not located in the air core section can be reduced compared with a case where all the bent sections are located inside the air core section.

In the above IC tag label, the single wire may include a plurality of extended sections, each of which is connected to an adjacent extended section via the bent section, and a sum of a distance between two adjacent extended sections and line widths of the two extended sections may be in a range of 0.225 mm or more and 3 mm or less.

With this configuration, since the sum of the distance between the extended sections and the line widths of two extended sections is highly unlikely to be larger than the diameter of a needle which can be pierced into the cap of the bottle, a wire break in the extended section is more likely to occur.

In the above IC tag label, the detection element may include a first linear section and a second linear section, and the first linear section and the second linear section may extend outward in a radial direction of the planar coil from different positions in a circumferential direction of the planar coil and may be located on a single straight line in plan view perpendicular to the first surface.

With this configuration, when the planar coil is attached to the bottle mouth, the first linear section and the second linear section can extend along the bottle neck, and thus a distance between the first linear section and the second linear section in the circumferential direction of the planar coil becomes a maximum. Accordingly, compared with a configuration in which the second linear section is located adjacent to the first linear section in the circumferential direction of the planar coil, it is possible to reduce occurrence of a situation where a wire break does not occur in either of the first linear section and the second linear section when the bottle is manipulated in the circumferential direction of the bottle neck.

In the above IC tag label, the planar coil may have a size such that, when positioned on the bottle mouth, one-half or more of a circumferential length of the planar coil is located inside an outer rim of the bottle mouth in plan view perpendicular to the first surface.

With this configuration, compared with a configuration in which most of the planar coil protrudes from the outer rim of the bottle mouth, the planar coil can be prevented from being deformed by an external force applied to the planar coil when the IC tag label is attached to the bottle mouth.

In the above IC tag label, the IC chip may be located inside an outer rim of the bottle mouth on the first surface when the planar coil is positioned on the bottle mouth, the bridge wiring may further include a wiring element located on the first surface and including a third end and a fourth end electrically connected to the IC chip, the second end may have a maximum line width in the planar coil, the fourth end may have a maximum line width in the wiring element, and when the planar coil is positioned on the bottle mouth, the second end and the fourth end may be located between an inner rim and an outer rim of the bottle mouth in plan view perpendicular to the first surface.

When the second end and the fourth end are located inside the inner rim of the bottle mouth and a needle is pierced into one of the ends, a probability that the IC chip can still perform communication via the communication antenna increases, compared with a case where a needle is pierced into the planar coil at a position other than the second end or a needle is pierced into the wiring element at a position other than the fourth end. In this regard, according to the above configuration in which the second end and the fourth end are located outside the inner rim of the bottle mouth, a probability that a needle, when pierced into the cap, pierces the single wire, increases. As a result, a probability that the IC chip becomes unable to communicate via the communication antenna increases.

Desired Advantageous Effects of Invention

According to the present invention, an IC tag label can be used to determine whether liquid has been removed or added to a bottle without opening a cap.

DESCRIPTION OF REPRESENTATIVE EMBODIMENTS

Figure 1:
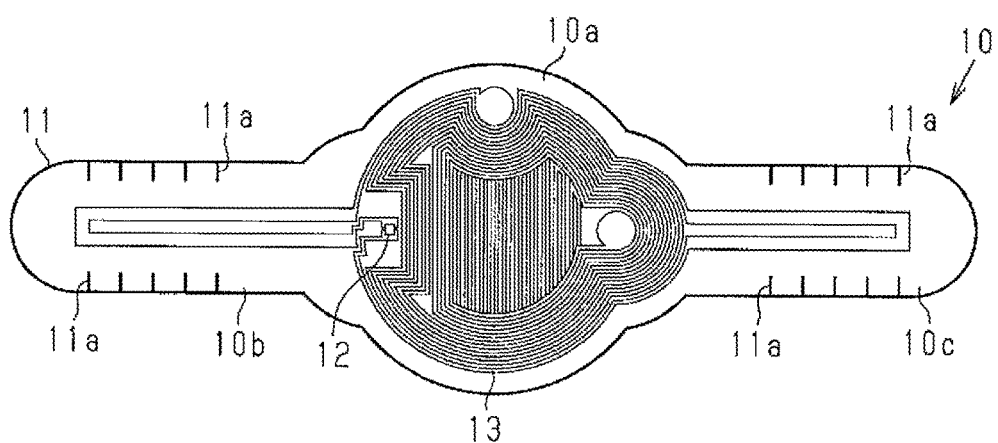
FIG. 1 is a plan view illustrating a structure of an IC tag label in a first embodiment.

With reference to the drawings, a description will now be given of representative embodiments according to the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. The same constituent elements are denoted by the same reference numerals unless there is a reason for the sake of convenience, and redundant description is omitted. In the drawings referred to in the following description, for clarity, characteristic parts are enlarged, and thus the components are not shown to scale. It is, however, clear that one or more embodiments can be implemented without such details. In addition, known structures and devices may be schematically represented for simplicity.

First Embodiment

With reference to FIGS. 1 to 8, a first embodiment of an IC tag label will be described. In the first embodiment, an example in which an IC tag label is attached to a wine bottle is described. The following describes, in sequence, an overall configuration of an IC tag label, a configuration of a front surface pattern, a configuration of a rear surface pattern, effects of an IC tag label, and examples.

Overall Configuration of IC Tag Label

Figure 2:
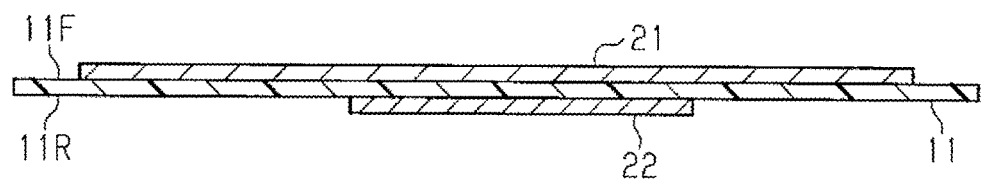
FIG. 2 is a cross-sectional view schematically illustrating a structure of the IC tag label in the first embodiment.

With reference to FIGS. 1 and 2, an overall configuration of an IC tag label will now be described.

As shown in FIG. 1, an IC tag label 10 includes a substrate 11 having a front surface and a rear surface, an IC chip 12 located on the front surface, and a communication antenna 13 connected to the IC chip 12.

The substrate 11 is elongated in one direction and has a size that protrudes outside from the communication antenna 13 in plan view perpendicular to the substrate 11. The substrate 11 has a plurality of slits 11a. The respective slits 11a are located outside the communication antenna 13, and extend inward from the edge of the substrate 11. The respective slits 11a are cuts formed in the substrate 11, and may or may not penetrate the substrate 11 in a thickness direction. The substrate 11 may be made of a variety of resins such as PET.

The IC chip 12 can perform communication using the communication antenna 13. The IC chip 12 performs communication, for example, with a reader for the IC chip 12 by using a predetermined communication method. Further, the IC chip 12 may be located on a rear surface of the substrate 11.

The IC tag label 10 is composed of a first portion 10a, a second portion 10b, and a third portion 10c. In plan view perpendicular to the substrate 11, the first portion 10a has a substantially circular shape, and the second portion 10b and the third portion 10c each have a straight line shape extending in a radial direction of the first portion 10a at positions outside the first portion 10a. The first portion 10a is sandwiched between the second portion 10b and the third portion 10c in one direction.

When the IC tag label 10 is attached to a wine bottle, the first portion 10a is positioned on a bottle mouth of the wine bottle. The second portion 10b and the third portion 10c are each positioned on a bottle neck.

As shown in FIG. 2, in the substrate 11, a front surface 11F and a rear surface 11R face away from each other. On the front surface 11F of the substrate 11, a front surface pattern 21 that constitutes the communication antenna 13 is located. On the rear surface 11R of the substrate 11, a rear surface pattern 22, which is part of a bridge wiring that connects the communication antenna 13 to the IC chip 12 is located.

The front surface pattern 21 is formed of a front surface conductive wire, and the rear surface pattern 22 is formed of a rear surface conductive wire. Each of the front surface conductive wire and the rear surface conductive wire are formed of a metal such as aluminum. Further, each of the front surface conductive wire and the rear surface conductive wire may also be formed of a metal wire and an insulated cover layer covering the wire.

Configuration of Front Surface Pattern

Figure 3:
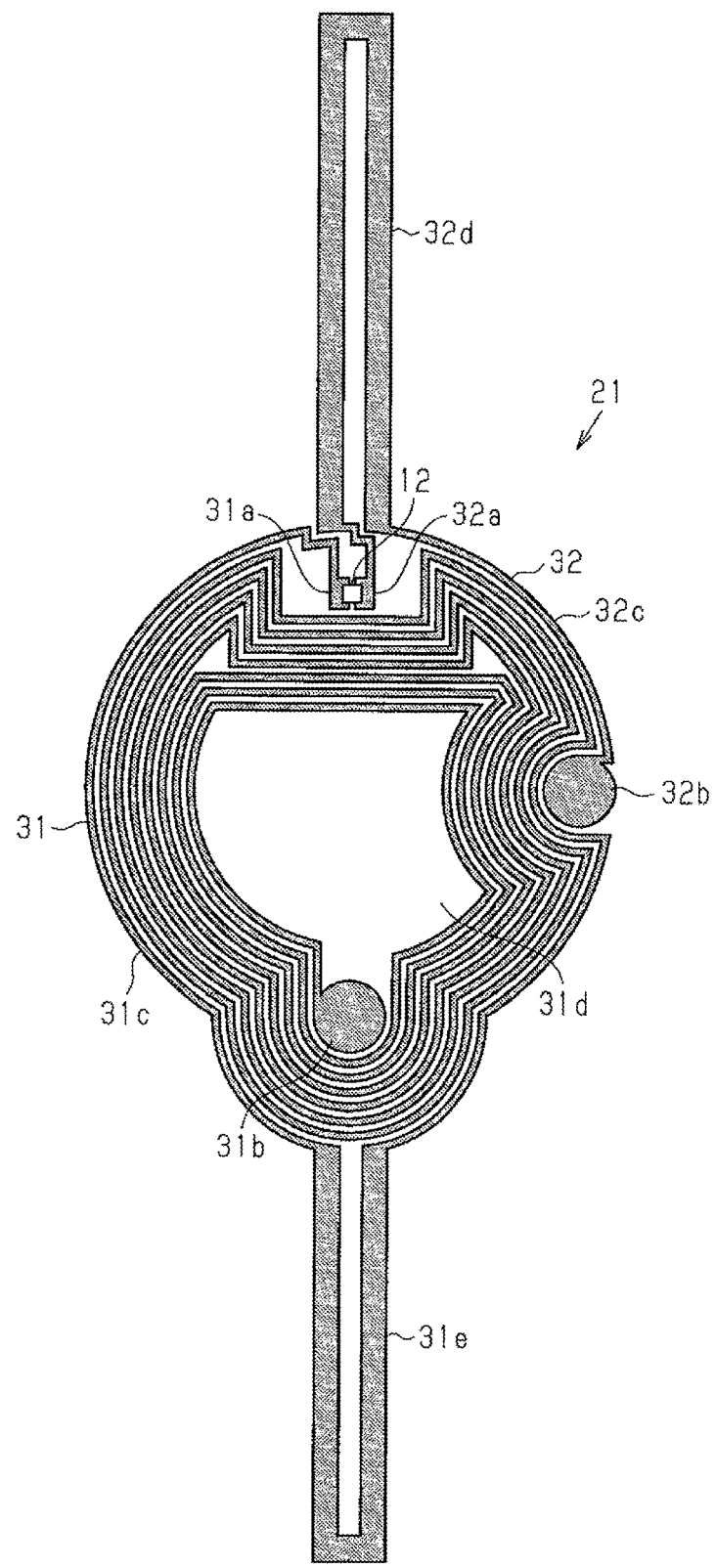
FIG. 3 is a plan view illustrating a structure of a front surface pattern in the first embodiment.

With reference to FIG. 3, a configuration of the front surface pattern 21 will be described.

As shown in FIG. 3, the front surface pattern 21 is composed of a first front surface pattern 31 and a second front surface pattern 32. Each pattern is formed of a single wire, which is a single conductive wire.

The first front surface pattern 31 includes a planar coil that extends along the front surface 11F, and has a first coil end 31a and a second coil end 31b. The front surface 11F is an example of a first surface, and the first front surface pattern 31 is an example of a first communication antenna element. The first coil end 31a is an example of a first end, and the second coil end 31b is an example of a second end. The first front surface pattern 31 has a shape suitable for positioning on the bottle mouth, and the first coil end 31a is electrically connected to the IC chip 12.

The first front surface pattern 31 further includes an annular section 31c. The annular section 31c has a spiral shape that turns a plurality of times on the front surface 11F. In other words, the annular section 31c has a swirl shape that extends in a two-dimensional plane. The annular section 31c defines an air core section 31d that includes the center of the planar coil. The air core section 31d is a region in which the single wire that forms the front surface pattern 21 is not located.

The first front surface pattern 31 further includes a first linear section 31e. In plan view perpendicular to the front surface 11F, the first linear section 31e has a straight line shape extending in a radial direction of the annular section 31c at a position outside the annular section 31c. The first linear section 31e is located at a position on the annular section 31c.

The second front surface pattern 32 is an example of a first wiring element, which is part of the bridge wiring. The bridge wiring is a wiring that electrically connects the second coil end 31b to the IC chip 12. The second front surface pattern 32 has a first front surface wiring end 32a and a second front surface wiring end 32b. The first front surface wiring end 32a is an example of a third end, and the second front surface wiring end 32b is an example of a fourth end. The first front surface wiring end 32a is electrically connected to the IC chip 12, and the second front surface wiring end 32b is electrically connected to a portion of the bridge wiring which is located on the rear surface 11R.

The second front surface pattern 32 further includes an arc section 32c and a second linear section 32d. The arc section 32c has a linear shape extending along part of an outer circumference of the first front surface pattern 31. In plan view perpendicular to the front surface 11F, the second linear section 32d has a straight line shape extending in a radial direction of the annular section 31c at a position outside the annular section 31c of the first front surface pattern 31.

Further, in plan view perpendicular to the front surface 11F, the first linear section 31e and the second linear section 32d extend outward in the radial direction of the annular section 31c from different positions in the circumferential direction of the annular section 31c such that they are located on a single straight line extending in the radial direction of the annular section 31c.

In the front surface pattern 21, the second coil end 31b and the second front surface wiring end 32b each have a line width larger than that of the remaining portion of the front surface pattern 21. That is, the second coil end 31b and the second front surface wiring end 32b have a maximum line width in the front surface pattern 21.

Further, the first coil end 31a, the second coil end 31b and the annular section 31c of the first front surface pattern 31, and the first front surface wiring end 32a, the second front surface wiring end 32b and the arc section 32c of the second front surface pattern 32 are included in the first portion 10a of the IC tag label 10. The first linear section 31e of the first front surface pattern 31 is included in the third portion 10c of the IC tag label 10, and the second linear section 32d of the second front surface pattern 32 is included in the second portion 10b of the IC tag label 10.

Configuration of Rear Surface Pattern

Figure 4:
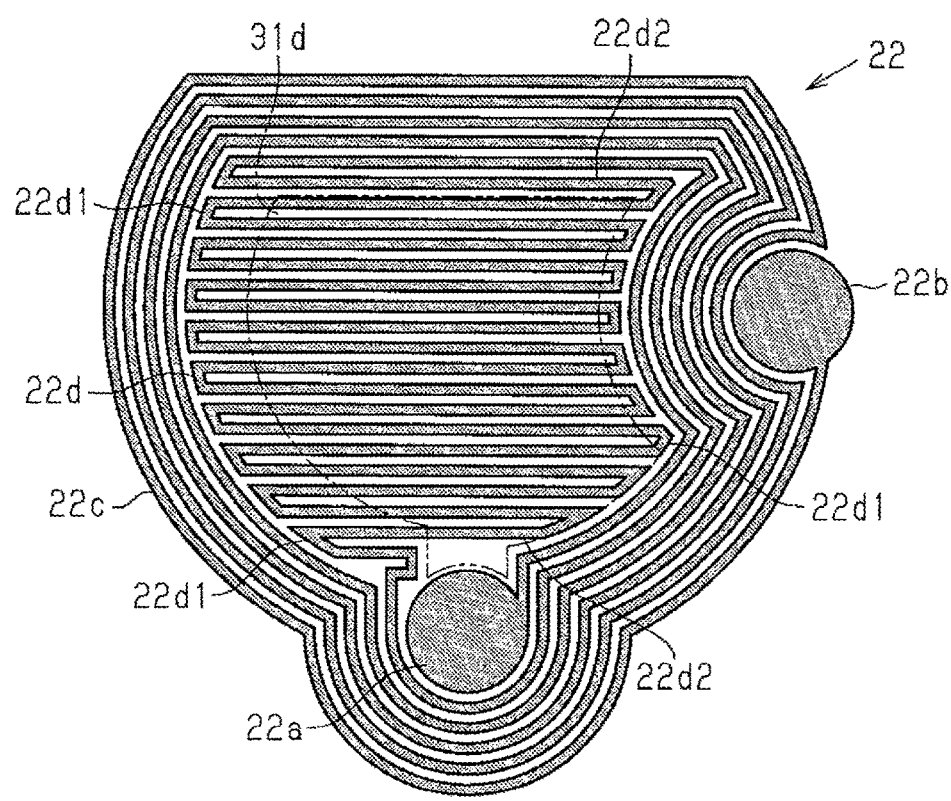
FIG. 4 is a plan view illustrating a structure of a rear surface pattern in the first embodiment.
Figure 5:
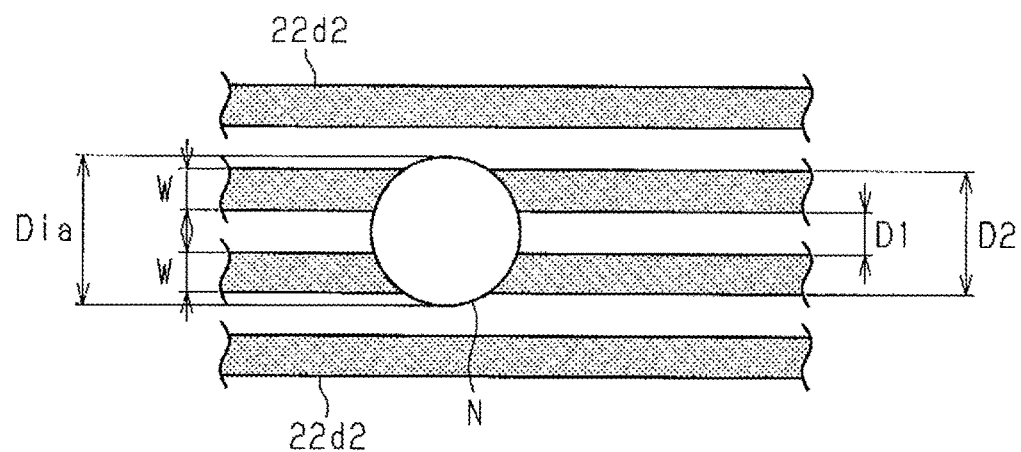
FIG. 5 is a partial enlarged plan view illustrating an enlarged view of a partial structure of a rear surface conductive wire in the first embodiment.

With reference to FIGS. 4 and 5, a configuration of the rear surface pattern will be described.

As shown in FIG. 4, the rear surface pattern 22 is a pattern included in the bridge wiring, and an example of a second wiring element located in an opposed region on the rear surface 11R opposed to the front surface 11F. The opposed region is a region in which the annular section 31c of the first front surface pattern 31 is located on the front surface 11F.

The rear surface pattern 22 has a first rear surface wiring end 22a and a second rear surface wiring end 22b. The first rear surface wiring end 22a and the second rear surface wiring end 22b are electrically connected to the second coil end 31b and the second front surface wiring end 32b, respectively. When viewed in the thickness direction of the substrate 11, the first rear surface wiring end 22a and the second rear surface wiring end 22b are overlapped with the second coil end 31b and the second front surface wiring end 32b, respectively.

For example, in a portion of the substrate 11 sandwiched between the first rear surface wiring end 22a and the second coil end 31b in the thickness direction of the substrate 11, a through hole is located. The first rear surface wiring end 22a is electrically connected to the second coil end 31b via a wiring embedded in the through hole. In a portion of the substrate 11 sandwiched between the second rear surface wiring end 22b and the second front surface wiring end 32b in the thickness direction of the substrate 11, a through hole is located. The second rear surface wiring end 22b is electrically connected to the second front surface wiring end 32b via a wiring embedded in the through hole.

Further, the first rear surface wiring end 22a and the second coil end 31b may also be crimped to be electrically connected to each other. Also, the second rear surface wiring end 22b and the second front surface wiring end 32b may also be crimped to be electrically connected to each other.

The rear surface pattern 22 further includes an annular section 22c and a folded line section 22d. In plan view perpendicular to the front surface 11F of the substrate 11, the annular section 22c has a spiral shape that turns a plurality of times on the rear surface 11R, and is overlapped with the annular section 31c of the first front surface pattern 31. An outer edge of the annular section 22c of the rear surface pattern 22 has a size substantially the same as an outer edge of the annular section 31c of the first front surface pattern 31. The annular section 22c is a planar coil located on the rear surface 11R, and serves as a second communication antenna element for the communication antenna 13.

The folded line section 22d is located in a region defined by the annular section 22c. In plan view perpendicular to the front surface 11F of the substrate 11, the folded line section 22d is formed of the single wire having a folded line shape which traverses the air core section 31d a plurality of times.

More specifically, the folded line section 22d includes a folded line shape having a zigzag shape, in other words, a meandering shape, provided with a plurality of bent sections 22d1. In plan view perpendicular to the front surface 11F of the substrate 11, a plurality of bent sections 22d1 is partially located outside the air core section 31d.

In the folded line section 22d, a portion connecting one bent section 22d1 to another bent section 22d1 is an extended section 22d2. The folded line section 22d includes a plurality of extended sections 22d2. The extended sections 22d2 each have a shape extending in one direction, and are arranged with a predetermined interval in a direction perpendicular to an extending direction of the extended sections 22d2. That is, a plurality of extended sections 22d2 are arranged substantially parallel with each other with a predetermined interval.

As shown in FIG. 5, a distance between two adjacent extended sections 22d2 in a direction in which the extended sections 22d2 are arranged is a first distance D1. The sum of the first distance D1 and line widths W of two extended sections 22d2 is a second distance D2. The second distance D2 is preferably in the range of, for example, 0.225 mm or more and 3 mm or less.

In some cases, genuine wine stored in a wine bottle may be replaced with counterfeit wine by piercing a needle N having a cylindrical shape into a cork plug to remove a genuine wine from the wine bottle and injecting a counterfeit wine into the wine bottle via the needle N. In order to ensure that a wire break occurs in the folded line sections 22d included in the single wire when such a needle N is pierced into the cork plug, the second distance D2 described above is preferably not larger than a diameter Dia of the needle N.

In this regard, when the second distance D2 is in the range of 0.225 mm or more and 3 mm or less, a probability of the second distance D2 being not larger than the diameter Dia of the needle N increases. Accordingly, a wire break in the folded line section 22d is more likely to occur.

The line widths W of the respective extended sections 22d2 may not be necessarily the same for all the extended sections 22d2, and the first distances D1 may not be necessarily the same for all the distances between adjacent extended sections 22d2, as long as the second distance D2 is within the above range.

In addition, the bridge wiring is composed of the rear surface pattern 22, the second front surface pattern 32, the wiring connecting the second coil end 31b to the first rear surface wiring end 22a, and the wiring connecting the second rear surface wiring end 22b to the second front surface wiring end 32b. Using such a bridge wiring, the second coil end 31b of the first front surface pattern 31 is electrically connected to the IC chip 12.

The rear surface pattern 22 has the first rear surface wiring end 22a, the folded line section 22d, the annular section 22c, and the second rear surface wiring end 22b, which are connected in this order. Further, the entire rear surface pattern 22 is included in the first portion 10a of the IC tag label 10.

Effects of IC Tag Label

Figure 6:
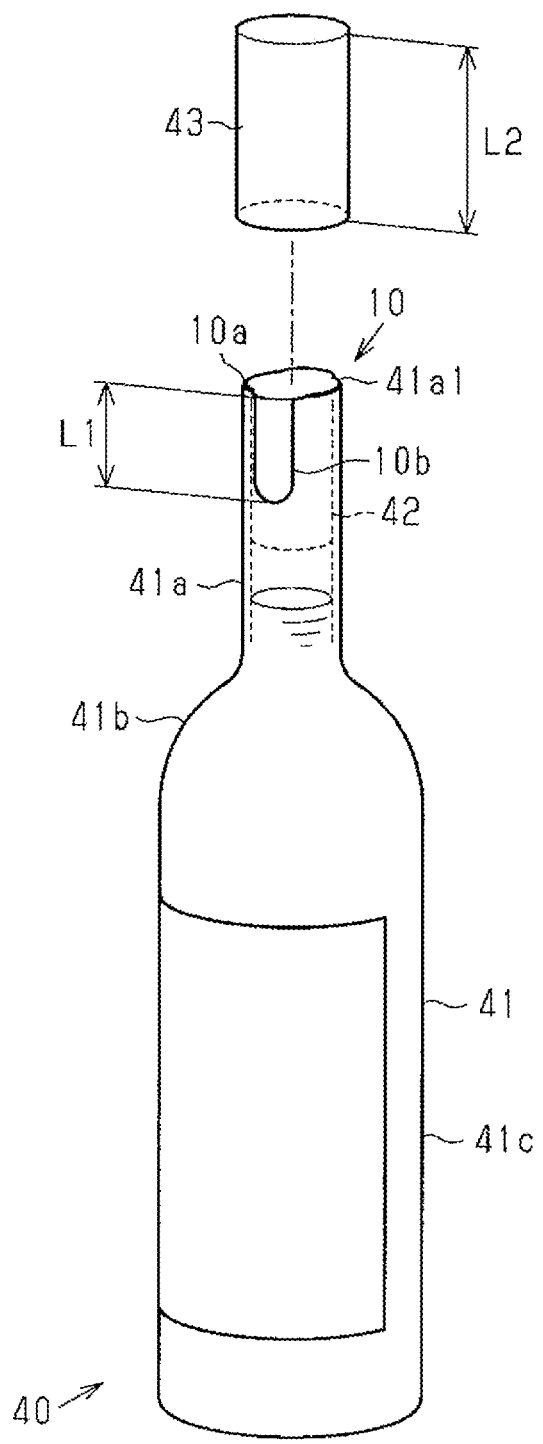
FIG. 6 is a perspective view illustrating the IC tag label of the first embodiment positioned on a wine bottle.
Figure 7:
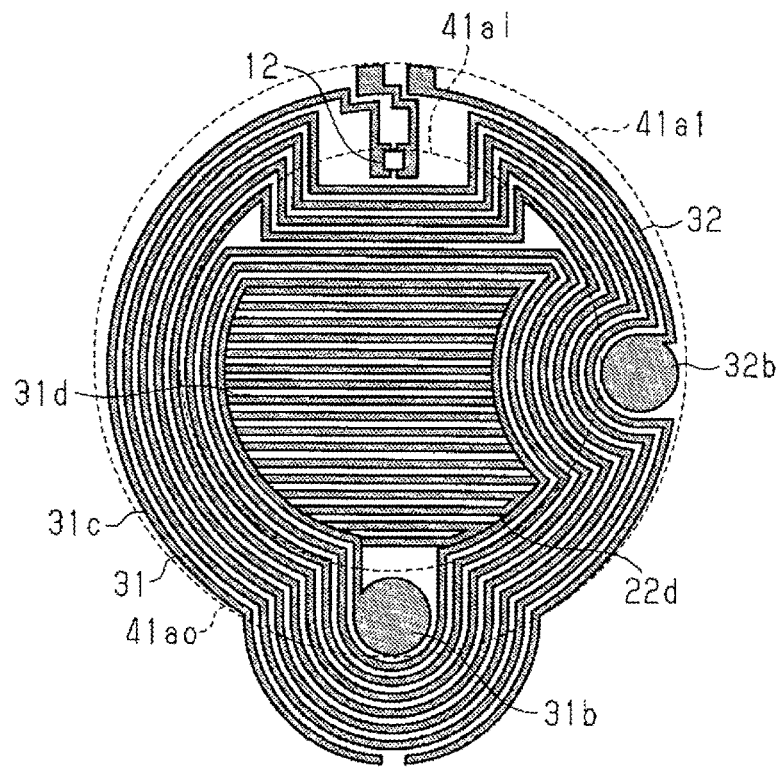
FIG. 7 is a plan view illustrating a structure of the IC tag label of the first embodiment as viewed in a direction perpendicular to a bottle mouth of a bottle main body.
Figure 8:
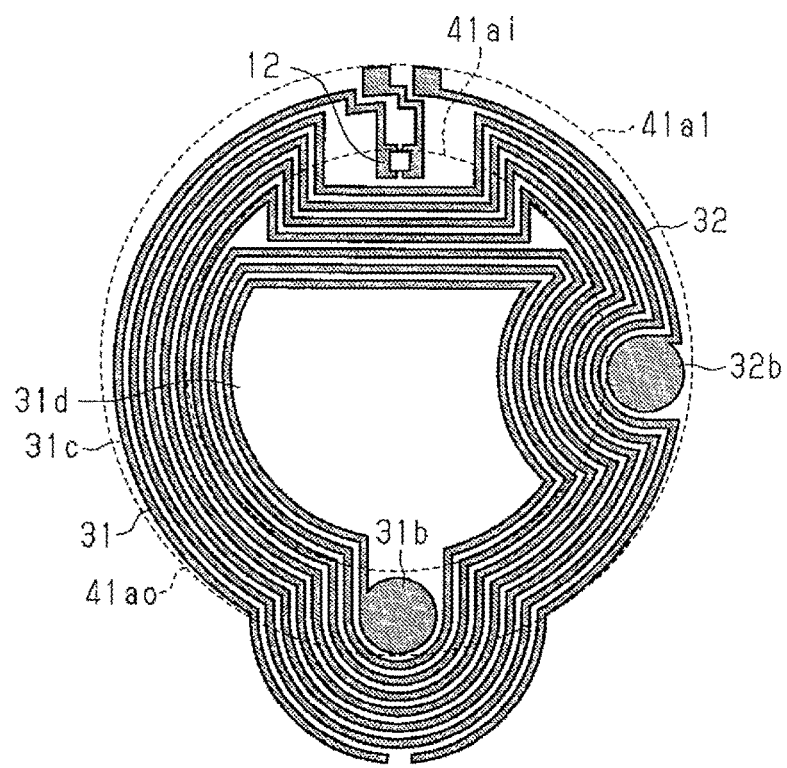
FIG. 8 is a plan view illustrating a structure of an IC tag label of a comparative example as viewed in a direction perpendicular to a bottle mouth of a bottle main body.

Referring to FIGS. 6 to 8, the effects of the IC tag label 10 will now be described. Prior to the description of the effects of the IC tag label 10, a description will be provided on how the IC tag label 10 is attached to a wine bottle.

As shown in FIG. 6, a wine bottle 40 includes a bottle main body 41, which is composed of a neck 41a, which is an example of a bottle neck, a shoulder 41b, and a body 41c. The neck 41a has a cylindrical shape, and an end of the neck 41a on a side opposite to the shoulder 41b is a bottle mouth 41a1 of the bottle main body 41. The neck 41a has a diameter smaller than that of the body 41c. The shoulder 41b has a diameter gradually increasing in a direction from the neck 41a toward the body 41c.

A cork plug 42, closing the bottle mouth 41a1 of the bottle main body 41, is located in the neck 41a. The wine bottle 40 further includes a capsule 43 that covers an outer circumferential surface of the neck 41a and the bottle mouth 41a1. In the wine bottle 40, the cork plug 42 and the capsule 43 form a cap that closes the bottle mouth 41a1 of the bottle main body 41.

As described above, the first portion 10a of the IC tag label 10 is positioned on the bottle mouth 41a1, and the second portion 10b and the third portion 10c are positioned on the outer circumferential surface of the neck 41a. Here, in the first front surface pattern 31 included in the first portion 10a, the second linear section 32d included in the second portion 10b and the first linear section 31e included in the third portion 10c extend outward from the annular section 31c in the radial direction of the annular section 31c. Accordingly, when the first front surface pattern 31 is positioned on the bottle mouth 41a1, the first linear section 31e and the second linear section 32d can be positioned on the outer circumferential surface of the neck 41a.

When the IC tag label 10 is attached to the wine bottle 40, the IC tag label 10 may be positioned on the neck 41a of the wine bottle 40 and then the capsule 43 may cover the neck 41a. Alternatively, when the IC tag label 10 is positioned on the wine bottle 40, the IC tag label 10 may be adhered to a surface of the capsule 43 which is to be in contact with the bottle main body 41, and then the IC tag label 10 together with the capsule 43 may be positioned on the neck 41a.

When the IC tag label 10 is attached to the neck 41a before the capsule 43, an adhesive layer is formed on the rear surface 11R of the substrate 11 so that the IC tag label 10 is adhered to the neck 41a via the adhesive layer. On the other hand, when the IC tag label 10 is attached to the capsule 43 before the neck 41a, an adhesive layer is formed on the front surface 11F of the substrate 11 so that the IC tag label 10 is adhered to the capsule 43 via the adhesive layer.

In the extending direction of the bottle main body 41, a length L1 of the second portion 10b extending along the outer circumferential surface of the neck 41a is smaller than a length L2 of the capsule 43. Accordingly, the IC tag label 10 is entirely covered with the capsule 43.

When the wine bottle 40 is opened, in general, the cork plug 42 located inside the neck 41a is pulled out from the neck 41a after the capsule 43 covering the neck 41a is peeled. Therefore, when the wine bottle 40 is opened, a wire break is likely to occur in at least one of the first linear section 31e and the second linear section 32d.

In addition, since the first linear section 31e and the second linear section 32d are located on a single straight line, a distance between the first linear section 31e and the second linear section 32d in the circumferential direction of the annular section 31c becomes a maximum. As a result, compared with a configuration in which the second linear section is located adjacent to the first linear section in the circumferential direction of the annular section 31c, it is possible to reduce occurrence of a situation where a wire break does not occur in either of the first linear section 31e and the second linear section 32d when the bottle is manipulated in the circumferential direction of the neck 41a.

On the other hand, in a configuration in which the second linear section is located adjacent to the first linear section in the circumferential direction of the annular section, if the capsule 43 is peeled while only a portion of the annular section other than the first linear section and the second linear section is peeled, a wire break does not occur in the first linear section or the second linear section.

Thus, according to the IC tag label 10, since the first linear section 31e and the second linear section 32d are located on the outer circumferential surface of the neck 41a, a wire break is likely to occur in the communication antenna 13 when the capsule 43 is peeled. As a result, the IC chip 12 is likely to become unable to communicate with a reader. Therefore, it is possible to recognize on the basis of the state of the IC tag label 10 that there is a high probability that the capsule 43 has been peeled and thus the wine bottle 40 has been opened.

FIG. 7 illustrates a plan structure of the IC tag label 10, which is attached to the bottle mouth 41a1, in plan view perpendicular to the front surface 11F. For the convenience of illustration, FIG. 7 shows the first front surface pattern 31, the second front surface pattern 32, and a portion of the rear surface pattern 22 which is overlapped with the air core section 31d defined by the first front surface pattern 31 in the IC tag label 10.

In plan view perpendicular to the bottle mouth 41a1, as shown in FIG. 7, the bottle mouth 41a1 is formed in a circular annular shape, and has an outer rim 41ao and an inner rim 41ai. In plan view perpendicular to the bottle mouth 41a1, the folded line section 22d is located in the air core section 31d defined by the first front surface pattern 31 such that the air core section 31d is positioned overlapped with the cork plug 42. Accordingly, when a needle N is pierced into the cork plug 42 of the wine bottle 40, a wire break caused by the needle N is likely to occur in the folded line section 22d, which is part of the bridge wiring. As a result, a probability that the IC chip 12 becomes unable to communicate with a reader increases.

Therefore, it is possible to recognize on the basis of the state of the IC tag label 10 that the wine bottle 40 has been tampered with, for example, by which genuine wine has been replaced with counterfeit wine as described above. In other words, the IC tag label 10 can be used to determine whether wine has been removed or added to the wine bottle 40 without opening the wine bottle 40.

Further, according to the IC tag label 10, it is difficult to remove or add wine to the wine bottle 40 without changing the state of the IC tag label 10. Accordingly, by providing the IC tag label 10 on the wine bottle 40, replacement of genuine wine with counterfeit wine can be prevented.

Moreover, since the folded line section 22d includes a zigzag shape, it is possible to prevent the folded line section 22d from affecting communication of the IC chip 12 when using the communication antenna 13 even if a pattern having a predetermined shape other than a straight line is used as a bridge wiring for electrically connecting the first front surface pattern 31 to the IC chip 12.

In plan view perpendicular to the front surface 11F of the substrate 11, among the plurality of bent sections 22d1 included in the folded line section 22d, at least part of the bent sections 22d1 are located outside the air core section 31d. Accordingly, the extended sections 22d2 connected to the bent sections 22d1 located outside the air core section 31d extend outside the edge of the air core section 31d. Therefore, compared with a case where all the bent sections 22d1 are located inside the air core section 31d, a region in which the folded line section 22d is not located in the air core section 31d can be reduced.

In plan view perpendicular to the front surface 11F of the substrate 11, in other words, in plan view perpendicular to the bottle mouth 41a1, one-half or more of the circumferential length of the annular section 31c is located inside the outer rim 41ao of the bottle mouth 41a1. In addition, in plan view perpendicular to the bottle mouth 41a1, a portion of the annular section 31c except for the portion located outside the second coil end 31b is located inside the outer rim 41ao of the bottle mouth 41a1.

Accordingly, compared with a configuration in which most of the first front surface pattern 31 protrudes outside from the outer rim 41ao of the bottle mouth 41a1, the first front surface pattern 31 can be prevented from being deformed by an external force applied to the first front surface pattern 31 when the IC tag label 10 and the capsule 43 are attached to the bottle mouth 41a1. Accordingly, breakage of the first front surface pattern 31 can be reduced.

Further, as described above, in plan view perpendicular to the front surface 11F, the second coil end 31b and the second front surface wiring end 32b are located outside the inner rim 41ai of the bottle mouth 41a1 and inside the outer rim 41ao of the bottle mouth 41a1. In other words, the second coil end 31b and the second front surface wiring end 32b are located between the inner rim 41ai and the outer rim 41ao. The second coil end 31b has a line width larger than that of the remaining portion of the first front surface pattern 31, and the second front surface wiring end 32b has a line width larger than that of the remaining portion of the second front surface pattern 32.

If the second coil end 31b and the second front surface wiring end 32b are located inside the inner rim 41ai of the bottle mouth 41a1 and a needle N is pierced into either of these ends, there is a higher probability that a wire break does not occur in the front surface pattern 21, compared with a case where the needle N is pierced into a portion of the front surface pattern 21 other than these ends.

In this regard, according to the configuration in which the second coil end 31b and the second front surface wiring end 32b are located outside the inner rim 41ai of the bottle mouth 41a1, the needle N is likely to be pierced into the folded line section 22d when it is pierced into the cork plug 42. As a result, a probability that the IC chip 12 becomes unable to communicate via the communication antenna 13 increases.

Further, since the second coil end 31b and the second front surface wiring end 32b are located inside the outer rim 41ao of the bottle mouth 41a1, the second coil end 31b and the second front surface wiring end 32b can be prevented from being deformed by an external force applied when the IC tag label 10 and the capsule 43 are attached to the bottle mouth 41a1. Accordingly, breakage of the second coil end 31b and the second front surface wiring end 32b can be reduced.

The IC chip 12 is located inside the outer rim 41ao of the bottle mouth 41a1, and also inside the inner rim 41ai of the bottle mouth 41a1. Accordingly, breakage of the IC chip 12 by an external force applied to the IC chip 12 when the IC tag label 10 and the capsule 43 is attached to the bottle mouth 41a1 can be reduced.

On the other hand, in plan view perpendicular to the front surface 11F of the substrate 11, as shown in FIG. 8, in a configuration in which the bridge wiring has a strip shape extending from the second coil end 31b to the second front surface wiring end 32b, the air core section 31d defined by the annular section 31c is a gap in which the folded line section is not located. Accordingly, when a needle N is pierced into the cork plug 42, there is a high probability that no wire break due to the needle N occurs in the bridge wiring that connects the communication antenna to the IC chip 12. As a consequence, it is difficult to recognize on the basis of the state of the IC tag label 10 whether wine has been removed or added to the wine bottle.

Example 1

A substrate formed of a PET film with a thickness of 38 μm, and an IC chip (Mifare Ultralight C, manufactured by NXP Co.) (Mifare is a registered trademark) were prepared. An aluminum film having a thickness of 30 μm was formed on the front surface and the rear surface of the substrate. Then, the aluminum films were etched to form a front surface pattern and a rear surface pattern. Here, a portion of the front surface pattern other than the respective ends had a line width of 0.3 mm, and a portion of the rear surface pattern other than the respective ends had a line width of 0.3 mm. Thus, a communication antenna was formed.

An IC chip was mounted on the front surface pattern via a conductive adhesive. Then, after the substrate was formed in a predetermined shape, slits were formed in the edge of the substrate. Thus, the IC tag label of example 1 was obtained.

In the IC tag label of Example 1, the IC tag label was attached to the wine bottle with the air core section defined by the first front surface pattern being overlapped with the cork plug of the wine bottle. Then, a capsule was attached to the bottle mouth of the wine bottle.

A needle was pierced into the cork plug of the wine bottle. After that, the needle was pulled out from the cork plug. Then, when a reader was held over the IC tag label, it was found that the IC chip was unable to communicate with the reader. That is, according to the IC tag label of Example 1, it was found that, when a needle has been pierced into a cork plug, the communication antenna became unable to work since part of the folded line section overlapped with the air core section in plan view perpendicular to the front surface was broken.

As described above, the first embodiment of the IC tag label can achieve the following effects.

(1) In plan view perpendicular to the front surface 11F, the folded line section 22d is located in the air core section 31d defined by the annular section 31c. Accordingly, when the needle N is pierced into the cap closing the bottle mouth 41a1, there is high probability that a wire break caused by the needle N occurs in part of the folded line section 22d. As a result, the IC chip 12 becomes unable to communicate with a reader. Therefore, it is possible to recognize on the basis of the state of the IC tag label 10 that the wine bottle 40 has been tampered with, for example, by which genuine wine has been replaced with counterfeit wine. In other words, the IC tag label 10 can be used to determine whether wine has been removed or added to the wine bottle 40 without opening the wine bottle 40.

(2) A portion of the extended sections 22d2 connected to the bent sections 22d1 which are located outside the air core section 31d extends outside the edge of the air core section 31d. Therefore, compared with a case where all the bent sections 22d1 are located inside the air core section 31d, a region in which the folded line section 22d is not located in the air core section 31d can be reduced.

(3) Since the sum of the distance between the extended sections 22d2 and the line widths W of two extended sections 22d2 is highly unlikely to be larger than the diameter Dia of the needle N which is pierced into the cap of the wine bottle 40, a wire break in the folded line section 22d is more likely to occur.

(4) When the first front surface pattern 31 is attached to the bottle mouth 41a1, the first linear section 31e and the second linear section 32d can extend along the neck 41a, and thus a distance between the first linear section 31e and the second linear section 32d in the circumferential direction of the annular section 31c becomes a maximum. Accordingly, compared with a configuration in which the second linear section is located adjacent to the first linear section in the circumferential direction of the annular section 31c, it is possible to reduce occurrence of a situation where a wire break does not occur in either of the first linear section 31e and the second linear section 32d when the bottle is manipulated in the circumferential direction of the neck 41a.

(5) Compared with a configuration in which most of the first front surface pattern 31 protrudes outside from the outer rim 41ao of the bottle mouth 41a1, the first front surface pattern 31 can be prevented from being deformed by an external force applied to the first front surface pattern 31 when the IC tag label 10 and the capsule 43 are attached to the bottle mouth 41a1. Accordingly, breakage of the first front surface pattern 31 can be reduced.

(6) Since the second coil end 31b and the second front surface wiring end 32b are located outside the inner rim 41ai of the bottle mouth 41a1, the needle N pierced into the capsule 43 and the cork plug 42 is more likely to be pierced into the folded line section 22d. As a result, a probability that the IC chip 12 becomes unable to communicate via the communication antenna 13 increases.

Modification of First Embodiment

The foregoing first embodiment can be appropriately modified and implemented as follows.

When the IC tag label 10 is positioned on the wine bottle 40, the IC chip 12 may be located outside the outer rim 41ao of the bottle mouth 41a1. In this configuration as well, the same effect as that described in the above (1) can be achieved as long as the rear surface pattern 22 includes the folded line section 22d overlapped with the air core section 31d in plan view perpendicular to the front surface 11F of the substrate 11.

At least one of the second coil end 31b and the second front surface wiring end 32b may also be located on the bottle mouth 41a1 at a position outside the outer rim 41ao of the bottle mouth 41a1 or a position inside the inner rim 41ai of the bottle mouth 41a1. Even if at least one of the second coil end 31b and the second front surface wiring end 32b is positioned on the bottle mouth 41a1 at either position described above, the same effect as that described in the above (1) can be achieved as long as the rear surface pattern 22 includes the folded line section 22d overlapped with the air core section 31d in plan view perpendicular to the front surface 11F.

Only less than one-half of the circumferential length of the annular section 31c may also be located inside the outer rim 41ao of the bottle mouth 41a1. In this configuration as well, the same effect as that described in the above (1) can be achieved as long as the rear surface pattern 22 includes the folded line section 22d overlapped with the air core section 31d in plan view perpendicular to the front surface 11F.

The first linear section 31e and the second linear section 32d may extend in the radial direction of the annular section 31c and may be located on different straight lines. In this configuration as well, the first linear section 31e and the second linear section 32d can be positioned on the outer circumferential surface of the neck 41a when the first front surface pattern 31 is positioned on the bottle mouth 41a1 since each linear section extends in the radial direction of the annular section 31c.

The first linear section 31e and the second linear section 32d may have a straight line shape extending in directions different from the radial direction of the annular section 31c. In this configuration as well, the first linear section 31e and the second linear section 32d are likely to be located on the neck 41a as long as each linear section is located outside the annular section 31c.

The front surface pattern 21 may include either one of the first linear section 31e and the second linear section 32d. In this configuration as well, the IC chip 12 becomes unable to communicate via the communication antenna 13 when a wire break occurs in one linear section.

In plan view perpendicular to the front surface 11F, the rear surface pattern 22 may include a linear section having a straight line shape extending in the radial direction of the annular section 22c outside the annular section 22c of the rear surface pattern 22. Such a linear section can exhibit the same function as that of the linear section of the front surface pattern 21. Further, both the front surface pattern 21 and the rear surface pattern 22 may have at least one linear section. Alternatively, while the rear surface pattern 22 includes a linear section, the front surface pattern 21 may not include a linear section.

The second distance D2 may be smaller than 0.225 mm, or larger than 3 mm. In this configuration as well, the same effect as that described in the above (1) can be achieved as long as the rear surface pattern 22 includes the folded line section.

In the rear surface pattern 22, a plurality of bent sections may be all located inside the air core section 31d. In this configuration as well, the same effect as that described in the above (1) can be achieved as long as the rear surface pattern 22 includes the folded line section overlapped with the air core section 31d in plan view perpendicular to the front surface 11F.

A plurality of extended sections of the folded line section may extend in one direction and have a shape other than a straight line shape, for example, a folded line shape, wave line shape, and zigzag shape, in other words, meandering shape.

The first linear section 31e and the second linear section 32d may have a zigzag shape, in other words, meandering shape in which a plurality of bent sections are arranged in an extending direction of the linear section.

The bridge wiring may not necessarily have the second front surface pattern 32 as long as it is configured to connect the second coil end 31b of the first front surface pattern 31 to the IC chip 12 and includes a wiring element. For example, the bridge wiring may be composed of a pattern located on the rear surface 11R, the wiring penetrating between the front surface 11F and the rear surface 11R, and a wiring connecting a pattern located on the rear surface 11R to the IC chip 12.

The substrate 11 is not limited to a single layer structure having the front surface 11F and the rear surface 11R, and may have a multilayered structure in which a plurality of layers is laminated. In such a configuration, among a plurality of layers, the front surface of the first layer may be a first surface, and either the front surface or the rear surface of the second layer may be a second surface. In this configuration, the first surface and the second surface are not adjacent to each other.

The single wire constituting the wiring element is not limited to the configuration having a folded line shape as described above, and may be a configuration having a spiral shape overlapped with the air core section 31d defined by the first front surface pattern 31 in plan view perpendicular to the front surface 11F.

Figure 9:
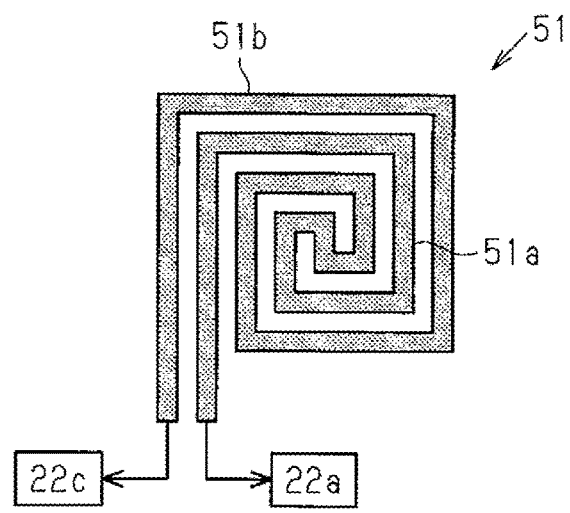
FIG. 9 is a plan view illustrating a structure of a spiral section in a modified example.

That is, as shown in FIG. 9, a spiral section 51 may have a spiral shape extending on the rear surface 11R of the substrate 11 in plan view perpendicular to the front surface 11F of the substrate 11. In other words, the spiral section 51 has a swirl shape that extends along the rear surface 11R of the substrate 11. The spiral section 51 is composed of the first portion 51a and the second portion 51b. The first portion 51a is a portion having a spiral shape turning in a first rotation direction, and the second portion 51b is a portion having a spiral shape turning in a second rotation direction, which is a rotation direction opposite to the first rotation direction. In the spiral section 51, an end of the first portion 51a is connected to the first rear surface wiring end 22a, and an end of the second portion 51b is connected to the annular section 22c. In this configuration as well, the same effect as that described in the above (1) can be achieved.

When the single wire constituting the wiring element includes a spiral shape, the following configurations may also be implemented.

Figure 10:
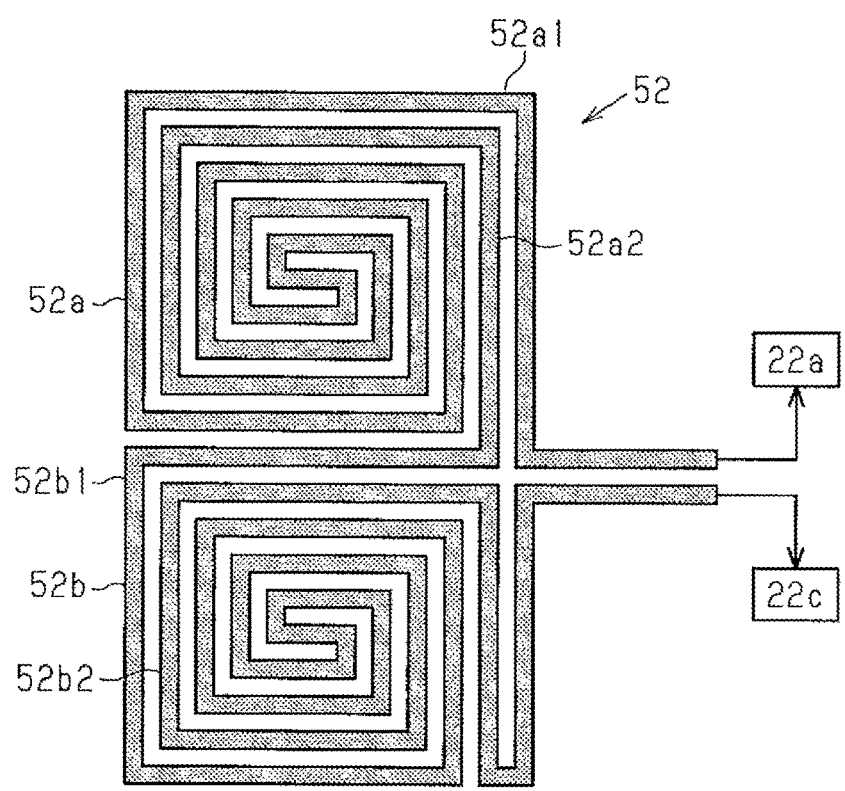
FIG. 10 is a plan view illustrating a structure of a spiral section in another modified example.

That is, as shown in FIG. 10, the spiral section 52 may include a first element 52a and the second element 52b having a spiral shape extending on the rear surface 11R of the substrate 11 in plan view perpendicular to the front surface 11F of the substrate 11. In other words, the spiral section 52 may include the first element 52a and the second element 52b having a swirl shape that extends along the rear surface 11R of the substrate 11. Each of the first element 52a and the second element 52b have the same configuration as that of the spiral section 51, which is described above in connection with FIG. 9. That is, the first element 52a includes a first portion 52a1 and a second portion 52a2, and the second element 52b includes a first portion 52b1 and a second portion 52b2. In the spiral section 52, an end of the first portion 52a1 of the first portion 52a is connected to the first rear surface wiring end 22a, and an end of the second portion 52b2 of the second portion 52b is connected to the annular section 22c. In this configuration as well, the same effect as that described in the above (1) can be achieved.

A communication antenna element located on the front surface 11F may also have a function as the communication antenna 13. In other words, a communication antenna element serving for the communication antenna 13 may not be necessarily located on the rear surface 11R.

The IC tag label 10 is not limited to the wine bottle 40, and may be attached to bottles in which a beverage other than wine is stored, or may be attached to bottles in which liquid other than beverages is stored. When the IC tag label 10 is attached to such bottles, it is possible to recognize on the basis of the state of the IC tag label 10 whether liquid stored in the bottle has been removed or added without opening a cap closing the bottle mouth since a planar coil included in the IC tag label 10 is attached to a bottle mouth.

Second Embodiment

With reference to FIGS. 11 to 14, a second embodiment of an IC tag label will be described. An IC tag label of the second embodiment differs from the IC tag label of the first embodiment in that it includes a wire break detection circuit. Accordingly, in the description below, such a difference will be described in detail, while the components in common with the first embodiment are denoted by the same reference signs as the first embodiment and the description thereof will be omitted. Further, the following describes, in sequence, a configuration of the front surface pattern, a configuration of the rear surface pattern, effects of the IC tag label, and examples.

Configuration of Front Surface Pattern

Figure 11:
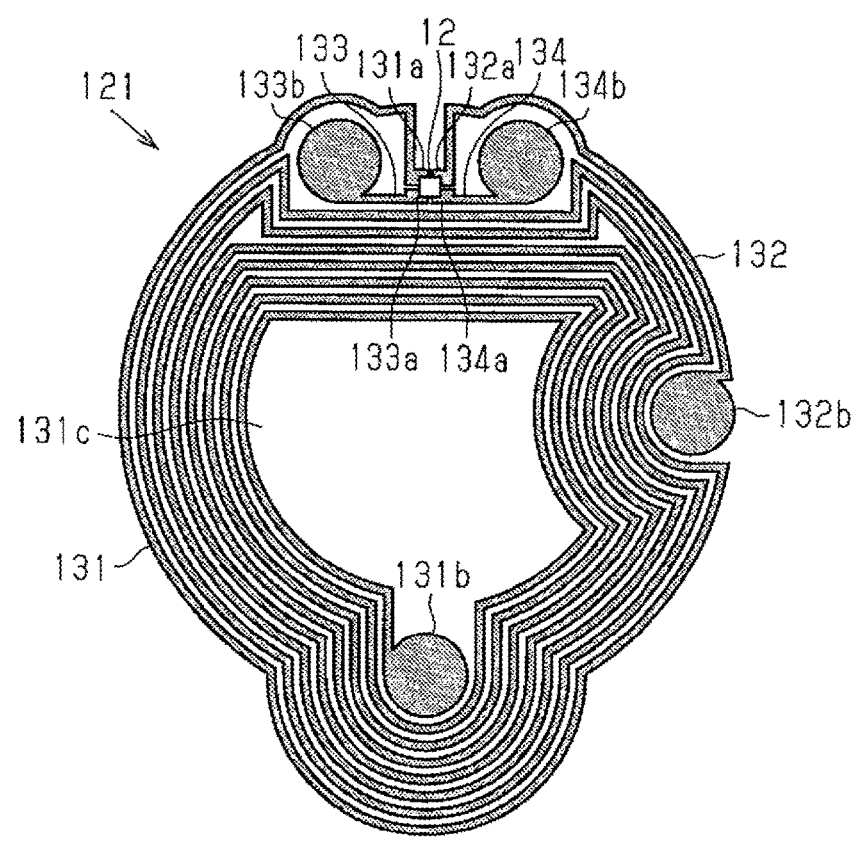
FIG. 11 is a plan view illustrating a structure of a front surface pattern in a second embodiment.

With reference to FIG. 11, a configuration of a front surface pattern 121 will be described.

As shown in FIG. 11, the front surface pattern 121 is composed of a first front surface pattern 131, a second front surface pattern 132, a third front surface pattern 133, and a fourth front surface pattern 134. Each pattern is formed of a single wire, which is a single conductive wire.

The first front surface pattern 131 is a planar coil that extends along the front surface 11F, and has a first coil end 131a and a second coil end 131b. The front surface 11F is an example of a first surface, and the first front surface pattern 131 is an example of a first communication antenna element. The first coil end 131a is an example of a first end, and the second coil end 131b is an example of a second end. The first front surface pattern 131 has a shape suitable for positioning on the bottle mouth, and the first coil end 131a is electrically connected to the IC chip 12.

The first front surface pattern 131 is a planar coil having a spiral shape turning a plurality of times along the front surface 11F. The first front surface pattern 131 defines an air core section 131c that includes the center of the planar coil.

The second front surface pattern 132 is an example of a wiring element, which is part of the bridge wiring. The bridge wiring is a wiring that electrically connects the second coil end 131b to the IC chip 12. The second front surface pattern 132 has a first front surface wiring end 132a and a second front surface wiring end 132b. The first front surface wiring end 132a is an example of a third end, and the second front surface wiring end 132b is an example of a fourth end. The first front surface wiring end 132a is electrically connected to the IC chip 12, and the second front surface wiring end 132b is electrically connected to a portion of the bridge wiring which is located on the rear surface 11R. The second front surface pattern 132 has a linear shape extending along part of an outer circumference of the first front surface pattern 131.

The third front surface pattern 133 is part of the wire break detection circuit, and has a first front surface detection end 133a and a second front surface detection end 133b. The first front surface detection end 133a is electrically connected to the IC chip 12, and the second front surface detection end 133b is electrically connected to a portion of the wire break detection circuit which is located on the rear surface 11R. The third front surface pattern 133 is located in a region which is defined by the first front surface pattern 131 but different from the air core section 131c.

As with the third front surface pattern 133, the fourth front surface pattern 134 is also part of the wire break detection circuit, and has a third front surface detection end 134a and a fourth front surface detection end 134b. The third front surface detection end 134a is electrically connected to the IC chip 12, and the fourth front surface detection end 134b is electrically connected to a portion of the wire break detection circuit which is located on the rear surface 11R. The fourth front surface pattern 134 is located in a space defined by the second front surface pattern 132 and the first front surface pattern 131 and adjacent to a space in which the third front surface pattern 133 is located.

In the front surface pattern 121, the second coil end 131b, the second front surface wiring end 132b, the second front surface detection end 133b, and the fourth front surface detection end 134b each have a line width larger than that of the remaining portion of the front surface pattern 121.

Further, the entire front surface pattern 121 is included in the first portion 10a of the IC tag label 10.

Configuration of Rear Surface Pattern

Figure 12:
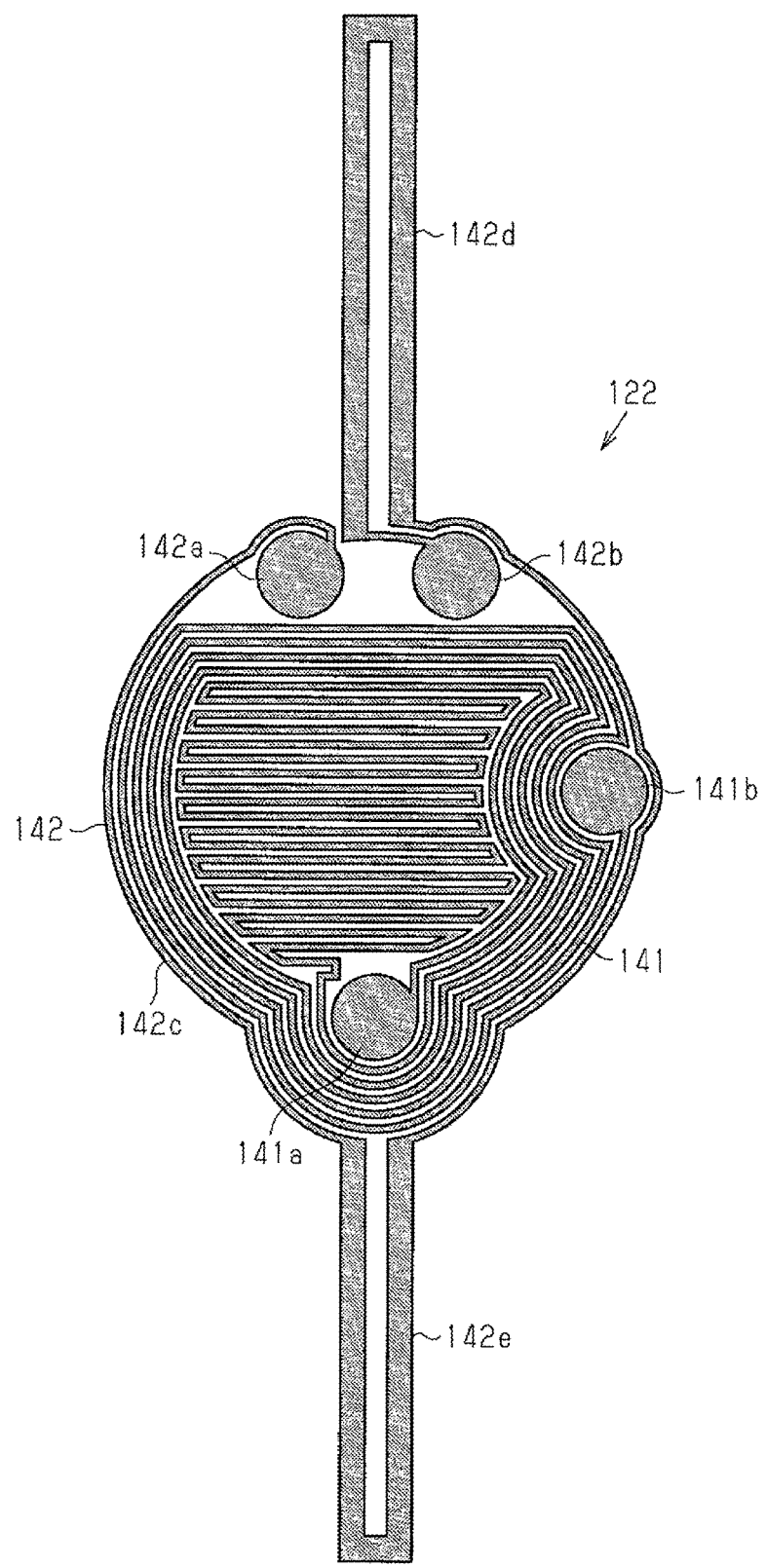
FIG. 12 is a plan view illustrating a structure of a rear surface pattern in the second embodiment.
Figure 13:
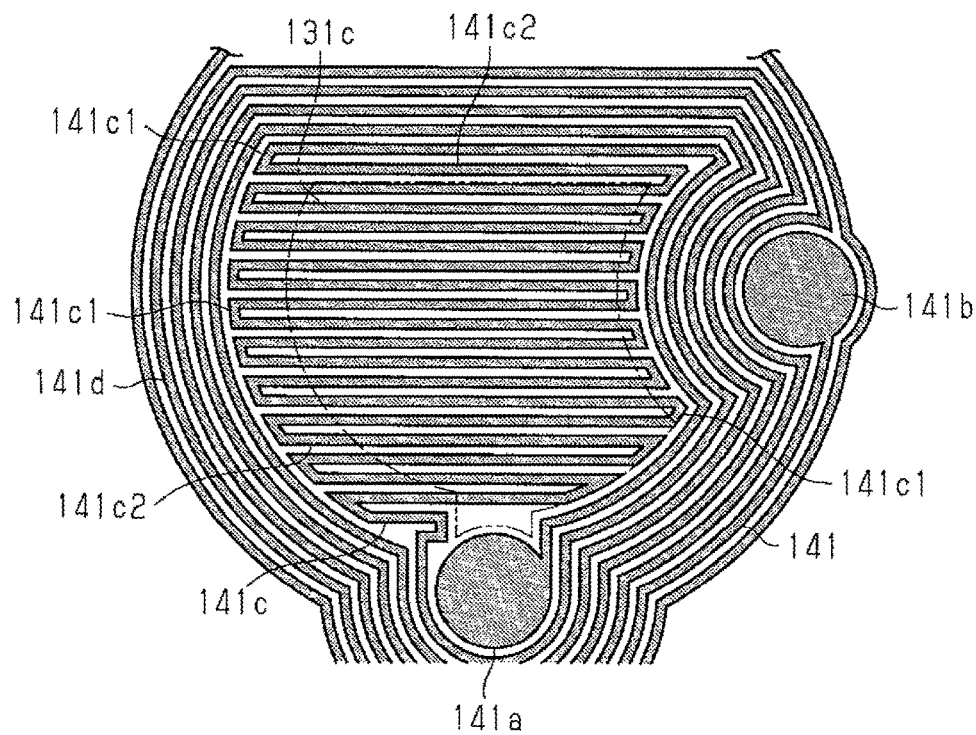
FIG. 13 is a partial enlarged plan view illustrating an enlarged view of a partial rear surface pattern in the second embodiment.

With reference to FIGS. 12 and 13, a configuration of the rear surface pattern will be described.

As shown in FIG. 12, the rear surface pattern 122 is composed of a first rear surface pattern 141 and a second rear surface pattern 142. Each pattern is formed of a single wire, which is a single conductive wire.

The second rear surface pattern 142 is part of the wire break detection circuit, and includes a detection element located on the rear surface 11R. The second rear surface pattern 142 has a first rear surface detection end 142a and a second rear surface detection end 142b. The first rear surface detection end 142a and the second rear surface detection end 142b are electrically connected to the second front surface detection end 133b and the fourth front surface detection end 134b, respectively. When viewed in the thickness direction of the substrate 11, the first rear surface detection end 142a and the second rear surface detection end 142b are overlapped with the second front surface detection end 133b and the fourth front surface detection end 134b, respectively.

For example, in a portion of the substrate 11 sandwiched between the first rear surface detection end 142a and the second front surface detection end 133b in the thickness direction of the substrate 11, a through hole is located. The first rear surface detection end 142a is electrically connected to the second front surface detection end 133b via a wiring embedded in the through hole. In a portion of the substrate 11 sandwiched between the second rear surface detection end 142b and the fourth front surface detection end 134b in the thickness direction of the substrate 11, a through hole is located. The second rear surface detection end 142b is electrically connected to the fourth front surface detection end 134b via a wiring embedded in the through hole.

Further, the first rear surface detection end 142a and the second front surface detection end 133b may also be crimped to be electrically connected to each other. Further, the second rear surface detection end 142b and the fourth front surface detection end 134b may also be crimped to be electrically connected to each other.

The second rear surface pattern 142 further includes an annular section 142c, a first linear section 142d, and a second linear section 142e. The first linear section 142d and the second linear section 142e are examples of the detection element. The annular section 142c has a substantially circular annular shape, and is substantially overlapped with an outer edge of the first front surface pattern 131, and a portion connecting the first front surface wiring end 132a to the second front surface wiring end 132b in the second front surface pattern 132 in plan view perpendicular to the front surface 11F of the substrate 11. That is, the annular section 142c is located in an opposed region, which is a region on the rear surface 11R opposed to the first front surface pattern 131, which is a planar coil, on the front surface 11F.

In plan view perpendicular to the front surface 11F of the substrate 11, the first linear section 142d and the second linear section 142e each have a straight line shape extending outward from the annular section 142c in a radial direction of the annular section 142c. That is, the first linear section 142d and the second linear section 142e are located outside the opposed position. In other words, in plan view perpendicular to the front surface 11F, the first linear section 142d and the second linear section 142e extend outward in the radial direction of the first front surface pattern 131 from different positions in the circumferential direction of the first front surface pattern 131 such that they are located on a single straight line extending in the radial direction of the first front surface pattern 131.

The second rear surface pattern 142 has the first rear surface detection end 142a, the annular section 142c, the first linear section 142d, and the second rear surface detection end 142b, which are connected in this order, and the second linear section 142e is located between the first rear surface detection end 142a and the first linear section 142d at a position on the annular section 142c.

The wire break detection circuit is composed of the second rear surface pattern 142, the third front surface pattern 133, the fourth front surface pattern 134, the wiring connecting the first rear surface detection end 142a to the second front surface detection end 133b, and the wiring connecting the second rear surface detection end 142b to the fourth front surface detection end 134b.

The first rear surface pattern 141 is a pattern included in the bridge wiring, and is located in the opposed region on the rear surface 11R opposed to the front surface 11F. The first rear surface pattern 141 has a first rear surface wiring end 141a and a second rear surface wiring end 141b. The first rear surface wiring end 141a and the second rear surface wiring end 141b are electrically connected to the second coil end 131b and the second front surface wiring end 132b, respectively. When viewed in the thickness direction of the substrate 11, the first rear surface wiring end 141a and the second rear surface wiring end 141b are overlapped with the second coil end 131b and the second front surface wiring end 132b, respectively.

For example, in a portion of the substrate 11 sandwiched between the first rear surface wiring end 141a and the second coil end 131b in the thickness direction of the substrate 11, a through hole is located. The first rear surface wiring end 141a is electrically connected to the second coil end 131b via a wiring embedded in the through hole. In a portion of the substrate 11 sandwiched between the second rear surface wiring end 141b and the second front surface wiring end 132b in the thickness direction of the substrate 11, a through hole is located. The second rear surface wiring end 141b is electrically connected to the second front surface wiring end 132b via a wiring embedded in the through hole.

Further, the first rear surface wiring end 141a and the second coil end 131b may also be crimped to be electrically connected to each other. Further, the second rear surface wiring end 141b and the second front surface wiring end 132b may also be crimped to be electrically connected to each other.

The bridge wiring is composed of the first rear surface pattern 141, the second front surface pattern 132, the wiring connecting the second coil end 131b to the first rear surface wiring end 141a, and the wiring connecting the second rear surface wiring end 141b to the second front surface wiring end 132b. By such a bridge wiring, the second coil end 131b of the first front surface pattern 131 is electrically connected to the IC chip 12.

The first rear surface pattern 141 is located in a region defined by the annular section 142c of the second rear surface pattern 142, and extends throughout substantially the entire region defined by the annular section 142c except for a region in which the first rear surface detection end 142a and the second rear surface detection end 142b are located in plan view perpendicular to the front surface 11F of the substrate 11.

As shown in FIG. 13, the first rear surface pattern 141, which is an example of the single wire, further includes a folded line section 141c and an annular section 141d. The annular section 141d has a spiral shape that turns a plurality of times on the front surface 11F, and defines a region in which the folded line section 141c is located. The annular section 141d is a planar coil located on the rear surface 11R, and serves as a second communication antenna element for the communication antenna 13.

In plan view perpendicular to the front surface 11F of the substrate 11, the folded line section 141c has a folded line shape which traverses the air core section 131c a plurality of times. More specifically, the folded line section 141c includes a folded line shape having a zigzag shape, in other words, meandering shape, provided with a plurality of bent sections 141c1. In plan view perpendicular to the front surface 11F of the substrate 11, a plurality of bent sections 141c1 is partially located outside the air core section 131c.

In the folded line section 141c, a portion connecting one bent section 141c1 to another bent section 141c1 is an extended section 141c2. The folded line section 141c includes a plurality of extended sections 141c2. The extended sections 141c2 each have a shape extending in one direction, and are arranged with a predetermined interval in a direction perpendicular to an extending direction of the extended sections 141c2.

Effects of IC Tag Label

Figure 14:
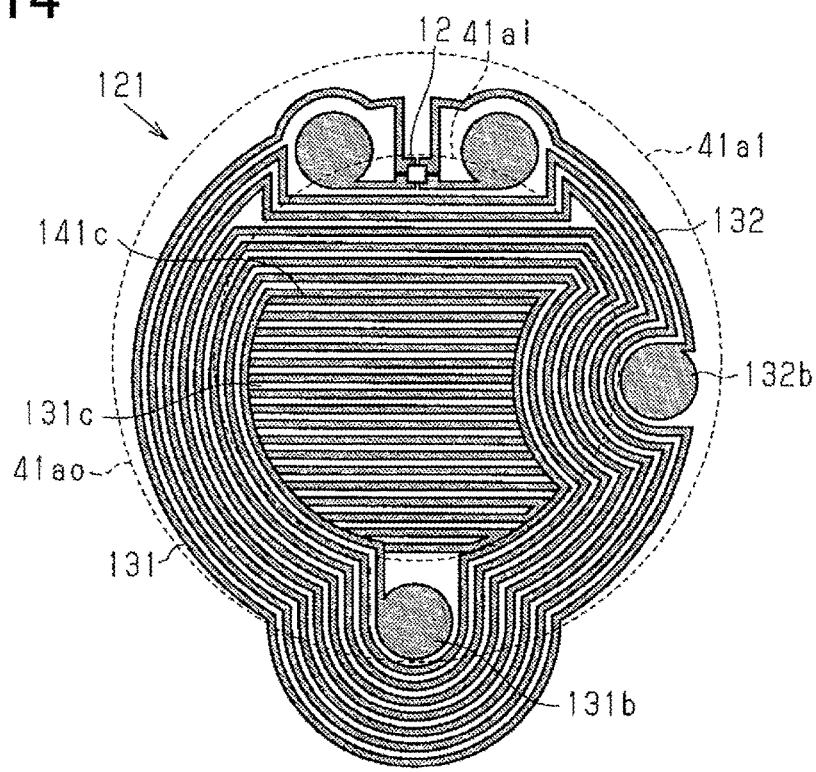
FIG. 14 is a plan view illustrating a structure of the IC tag label of the second embodiment as viewed in a direction perpendicular to a bottle mouth of a bottle main body.

Referring to FIG. 14, effects of the IC tag label 10 will now be described.

FIG. 14 illustrates a plan structure of the IC tag label 10, which is attached to the bottle mouth 41a1, in plan view perpendicular to the front surface 11F. For the convenience of illustration, FIG. 14 shows the first front surface pattern 131, the second front surface pattern 132, and a portion of the first rear surface pattern 141 which is overlapped with the air core section 131c defined by the first front surface pattern 131 in the IC tag label 10.

As shown in FIG. 14, in plan view perpendicular to the bottle mouth 41a1, the folded line section 141c is located in the air core section 131c defined by the first front surface pattern 131 such that the air core section 131c is positioned overlapped with the cork plug 42. Accordingly, when the needle N is pierced into the cork plug 42 of the wine bottle 40, a wire break by the needle N is likely to occur in the folded line section 141c, which is part of the bridge wiring. As a result, a probability that the IC chip 12 becomes unable to communicate with a reader increases.

Therefore, it is possible to recognize on the basis of the state of the IC tag label 10 that the wine bottle 40 has been tampered with, for example, by which genuine wine has been replaced with counterfeit wine as described above. In other words, the IC tag label 10 can be used to determine whether wine has been removed or added to the wine bottle 40 without opening the wine bottle 40.

Further, according to the IC tag label 10, it is difficult to remove or add wine to the wine bottle 40 without changing the state of the IC tag label 10. Accordingly, by providing the IC tag label 10 on the wine bottle 40, replacement of genuine wine with counterfeit wine can be prevented.

Moreover, since the folded line section 141c includes a zigzag shape, it is possible to prevent the folded line section 141c from affecting communication of the IC chip 12 when using the communication antenna 13 even if a pattern having a predetermined shape other than a straight line is used as a bridge wiring for electrically connecting the first front surface pattern 131, which is a communication antenna element, to the IC chip 12.

In plan view perpendicular to the front surface 11F of the substrate 11, among the plurality of bent sections 141c1 included in the folded line section 141c, at least part of the bent sections 141c1 are located outside the air core section 131c. Accordingly, the extended sections 141c2 connected to the bent sections 141c1 located outside the air core section 131c extend outside the edge of the air core section 131c. Therefore, compared with a case where all the bent sections 141c1 are located inside the air core section 131c, a region in which the folded line section 141c is not located in the air core section 131c can be reduced.

In plan view perpendicular to the front surface 11F of the substrate 11, in other words, in plan view perpendicular to the bottle mouth 41a1, one-half or more of the circumferential length of the first front surface pattern 131 is located inside the outer rim 41ao of the bottle mouth 41a1. In addition, in plan view perpendicular to the bottle mouth 41a1, a portion of the first front surface pattern 131 except for the portion located outside the second coil end 131b is located inside the outer rim 41ao of the bottle mouth 41a1.

Compared with a configuration in which most of the first front surface pattern 131 protrudes outside from the outer rim 41ao of the bottle mouth 41a1, the first front surface pattern 131 can be prevented from being deformed by an external force applied to the first front surface pattern 131 when the IC tag label 10 and the capsule 43 are attached to the bottle mouth 41a1. Accordingly, breakage of the first front surface pattern 131 can be reduced.

Further, as described above, in plan view perpendicular to the front surface 11F, the second coil end 131b and the second front surface wiring end 132b are located outside the inner rim 41ai of the bottle mouth 41a1 and inside the outer rim 41ao of the bottle mouth 41a1. Further, the second coil end 131b has a line width larger than that of the remaining portion of the first front surface pattern 131, and the second front surface wiring end 132b has a line width larger than that of the remaining portion of the second front surface pattern 132.

If the second coil end 131b and the second front surface wiring end 132b are located inside the inner rim 41ai of the bottle mouth 41a1 and a needle N is pierced into either of these ends, there is a high probability that a wire break does not occur in the front surface pattern 21, compared with a case where the needle N is pierced into a portion of the front surface pattern 21 other than these ends.

In this regard, according to the configuration in which the second coil end 131b and the second front surface wiring end 132b are located outside the inner rim 41ai of the bottle mouth 41a1, the needle N is likely to be pierced into the folded line section 141c when it is pierced into the cork plug 42. As a result, a probability that the IC chip 12 becomes unable to communicate via the communication antenna 13 increases.

Further, since the second coil end 131b and the second front surface wiring end 132b are located inside the outer rim 41ao of the bottle mouth 41a1, the second coil end 131b and the second front surface wiring end 132b can be prevented from being deformed by an external force applied when the IC tag label 10 and the capsule 43 are attached to the bottle mouth 41a1. Accordingly, breakage of the second coil end 131b and the second front surface wiring end 132b can be reduced.

The IC chip 12 is located inside the outer rim 41ao of the bottle mouth 41a1, and also inside the inner rim 41ai of the bottle mouth 41a1 on the front surface 11F of the IC chip 12. Accordingly, breakage of the IC chip 12 by an external force applied to the IC chip 12 when the IC tag label 10 and the capsule 43 are attached to the bottle mouth 41a1 can be reduced.

Example 2

A substrate formed of a PET film with a thickness of 38 μm, and an IC chip (VaultIC154, manufactured by WISeKey S.A) were prepared. An aluminum film having a thickness of 30 µm was formed on the front surface and the rear surface of the substrate. Then, the aluminum films were etched to form a front surface pattern and a rear surface pattern. Here, a portion of the front surface pattern other than the respective ends had a line width of 0.3 mm, and a portion of the rear surface pattern other than the respective ends had a line width of 0.3 mm. Thus, a communication antenna and a wire break detection circuit were formed.

An IC chip was mounted on the front surface pattern via a conductive adhesive. Then, after the substrate was formed in a predetermined shape, slits were formed in the edge of the substrate. Thus, the IC tag label of example 2 was obtained.

In the IC tag label of Example 2, the IC tag label was attached to the wine bottle with the air core section defined by the first front surface pattern being overlapped with the cork plug of the wine bottle. Then, a capsule was attached to the bottle mouth of the wine bottle.

A needle was pierced into the cork plug of the wine bottle. After that, the needle was pulled out from the cork plug. Then, when a reader was held over the IC tag label, it was found that the IC chip was unable to communicate with the reader. That is, according to the IC tag label of Example 2, it was found that, when a needle has been pierced into a cork plug, the communication antenna became unable to work since part of the folded line section overlapped with the air core section in plan view perpendicular to the front surface was broken.

As described above, according to the second embodiment of the IC tag label, the same effect as that of the above (1) to (6) can be achieved.

Third Embodiment

Figure 15:
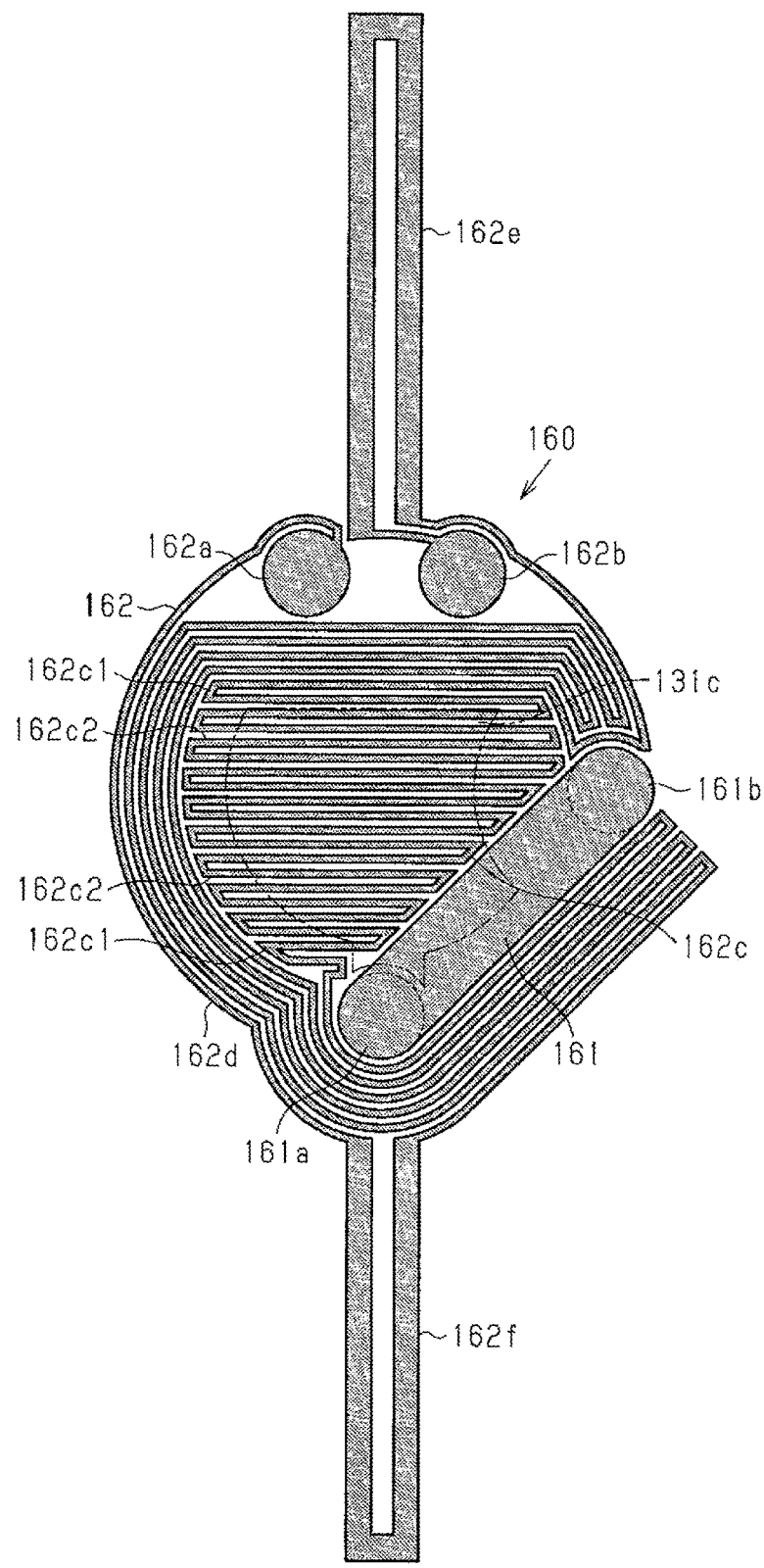
FIG. 15 is a plan view illustrating a structure of a rear surface pattern in an IC tag label in a third embodiment.

With reference to FIG. 15, a third embodiment of an IC tag label will be described. An IC tag label of the third embodiment differs from the IC tag label of the second embodiment in the shape of the rear surface pattern. Accordingly, in the description below, such a difference will be described in detail, while the description of the components in common with the second embodiment will be omitted. Further, the first front surface pattern 131 in the second embodiment corresponds to a planar coil in the third embodiment, which serves as the communication antenna 13.

Configuration of Rear Surface Pattern

With reference to FIG. 15, a configuration of the rear surface pattern will be described.

As shown in FIG. 15, the rear surface pattern 160 is composed of a first rear surface pattern 161 and a second rear surface pattern 162 including a detection element.

The first rear surface pattern 161 has a first rear surface wiring end 161a and a second rear surface wiring end 161b. The first rear surface pattern 161 has a strip shape extending from the first rear surface wiring end 161a toward the second rear surface wiring end 161b. The first rear surface pattern 161 has a line width equal to a diameter of the respective ends and larger than a line width of the rear surface conductive wire constituting the second rear surface pattern 162. The first rear surface pattern 161 is included in the bridge wiring.

For example, in a portion of the substrate 11 sandwiched between the first rear surface wiring end 161a and the second coil end 131b in the thickness direction of the substrate 11, a through hole is located. The first rear surface wiring end 161a is electrically connected to the second coil end 131b via a wiring embedded in the through hole. In a portion of the substrate 11 sandwiched between the second rear surface wiring end 161b and the second front surface wiring end 132b in the thickness direction of the substrate 11, a through hole is located. The second rear surface wiring end 161b is electrically connected to the second front surface wiring end 132b via a wiring embedded in the through hole.

Further, the first rear surface wiring end 161a and the second coil end 131b may also be crimped to be electrically connected to each other. Further, the second rear surface wiring end 161b and the second front surface wiring end 132b may also be crimped to be electrically connected to each other.

Further, the bridge wiring may not necessarily be located on the rear surface 11R of the substrate 11, and may be located on an insulating film formed on the front surface 11F of the substrate 11. More specifically, the insulating film, which has a strip shape connecting the second coil end 131b and the second front surface wiring end 132b of the first front surface pattern 131 and formed to expose the respective ends there through, partially covers the first front surface pattern 131. The bridge wiring, which covers the second coil end 131b and the second front surface wiring end 132b while extending on the insulating film, is electrically connected to these ends.

The second rear surface pattern 162 is an example of the single wire, and is composed of a first rear surface detection end 162a, a second rear surface detection end 162b, a folded line section 162c, an annular section 162d, a first linear section 162e, and a second linear section 162f. The first linear section 162e and the second linear section 162f are examples of the detection element.

The folded line section 162c is overlapped with the air core section 131c defined by the first front surface pattern 131 in plan view perpendicular to the front surface 11F of the substrate 11. As with the folded line section 141c of the second embodiment, the folded line section 162c includes a folded line shape having a zigzag shape, in other words, meandering shape. The folded line section 162c is composed of a plurality of bent sections 162c1 and a plurality of extended sections 162c2.

The annular section 162d has a substantially annular shape surrounding the folded line section 162c and the first rear surface pattern 161. The first linear section 162e and the second linear section 162f each have a straight line shape extending outward from the annular section 162d in a radial direction of the annular section 162d. The first linear section 162e and the second linear section 162f are located on a single straight line extending in the radial direction of the annular section 162d.

The second rear surface pattern 162 has the first rear surface detection end 162a, the annular section 162d, the folded line section 162c, the first linear section 162e, and the second rear surface detection end 162b, which are connected in this order, and the second linear section 162f is located at a position on the annular section 162d. As with the second rear surface pattern 142 of the second embodiment, the second rear surface pattern 162 is included in the wire break detection circuit.

In this configuration, since the folded line section 162c has a zigzag shape, a plurality of extended sections 162c2 in the folded line section 162c are likely to be simultaneously broken when the folded line section 162c is broken. Accordingly, it is difficult to connect the broken portion of the folded line section 162c in the same manner as when the folded line section 162c is not broken, and thus it is difficult for the folded line section 162c to perform the function in the same manner as when it is not broken.

Further, the folded line section 162c is part of the wire break detection circuit. Accordingly, when part of the folded line section 162c is broken, the IC chip 12 can generate a signal indicative of a wire break of the wire break detection circuit and transmit the signal to a reader. Therefore, a user of the reader can recognize on the basis of a signal transmitted from the IC chip 12 that a wire break has occurred in the wire break detection circuit.

According to the third embodiment of the IC tag label described above, the following effect can be achieved in addition to the effects described in the above (2) to (6).

(7) In plan view perpendicular to the front surface 11F, the folded line section 162c is located in the air core section 131c defined by the first front surface pattern 31. Accordingly, when a needle N is pierced into the cap closing the bottle mouth 41a1, there is high probability that a wire break caused by the needle occurs in part of the folded line section 162c. Thus, a wire break occurs in the wire break detection circuit. Therefore, it is possible to recognize on the basis of the state of the IC tag label 10 that the wine bottle 40 has been tampered with, for example, by which genuine wine has been replaced with counterfeit wine.

Modifications of Second Embodiment and Third Embodiment

The foregoing second embodiment and third embodiment can be appropriately modified and implemented as follows.

At least one of the second coil end 131b and the second front surface wiring end 132b may also be located on the bottle mouth 41a1 at a position outside the outer rim 41ao of the bottle mouth 41a1 or a position inside the inner rim 41ai of the bottle mouth 41a1. Even if at least one of the second coil end 131b and the second front surface wiring end 132b is positioned at either position described above, the same effect as that described in the above (1) can be achieved as long as the rear surface pattern includes the folded line section overlapped with the air core section 131c in plan view perpendicular to the front surface 11F.

Alternatively, less than one-half of the circumferential length of the first front surface pattern 131 may be located inside the outer rim 41ao of the bottle mouth 41a1. In this configuration as well, the same effect as that described in the above (1) can be achieved as long as the rear surface pattern includes the folded line section overlapped with the air core section 131c in plan view perpendicular to the front surface 11F.

The first linear section and the second linear section may extend in the radial direction of the first front surface pattern 131 and may be located on different straight lines. In this configuration as well, the first linear section and the second linear section can be positioned on the outer circumferential surface of the neck 41a when the first front surface pattern 131 is positioned on the bottle mouth 41a1 since each linear section extends in the radial direction of the first front surface pattern 131.

The first linear section and the second linear section may have a straight line shape extending in directions different from the radial direction of the first front surface pattern 131. In this configuration as well, as long as each linear section is located outside the first front surface pattern 131, a wire break can occur in at least one of the linear sections while the IC chip 12 can perform communication via the communication antenna 13.

The wire break detection circuit may include only one of the first linear section and the second linear section. In this configuration as well, according to one linear section, a wire break can occur in the linear section while the IC chip 12 can perform communication via the communication antenna 13.

The first linear section and the second linear section may not be necessarily located on the rear surface 11R of the substrate 11, and may be located on the front surface 11F of the substrate 11. Any configuration is possible as long as the first linear section and the second linear section are each located outside the planar coil.

The first linear section and the second linear section may have a zigzag shape, in other words, meandering shape in which a plurality of bent sections are arranged in an extending direction of the linear section.

The bridge wiring may not necessarily have the second front surface pattern 132 as long as it is configured to electrically connect the second coil end 131b of the first front surface pattern 131 to the IC chip 12 and includes a wiring element. For example, the bridge wiring may be composed of a pattern located on the rear surface 11R, the wiring penetrating between the front surface 11F and the rear surface 11R, and a wiring connecting a pattern located on the rear surface 11R to the IC chip 12.

In the second embodiment, the single wire included in the wire break detection circuit and having a folded line shape may also be located on the front surface 11F of the substrate 11 rather than the rear surface 11R of the substrate 11. In this configuration as well, the same effect as that described in the above (1) can be achieved as long as the single wire having a folded line shape is overlapped with the air core section defined by the planar coil in plan view perpendicular to the front surface 11F.

The wire break detection circuit may not necessarily have the third front surface pattern 133 and the fourth front surface pattern 134 as long as it can be connected to the IC chip 12 and includes a detection element located on the rear surface 11R. For example, the wire break detection circuit may be composed of a pattern located on the rear surface 11R and two wirings penetrating between the front surface 11F and the rear surface 11R. In this case, one of the two wirings may be a wiring that connects one end of the pattern located on the rear surface 11R to the IC chip 12 and the other may be a wiring that connects the other end of the pattern located on the rear surface 11R to the IC chip 12.

The single wire included in the bridge wiring or in the wire break detection circuit is not limited to the configuration having a folded line shape as described above, and may be a configuration having a spiral shape overlapped with the air core section 131c defined by the first front surface pattern 31 in plan view perpendicular to the front surface 11F. That is, the single wire included in the bridge wiring or the wire break detection circuit may have a configuration described above in connection with FIGS. 9 and 10.

The configurations of the second embodiment and the third embodiment may be each implemented as appropriate in combination with the modification of the first embodiment described above.

Fourth Embodiment

Figure 16:
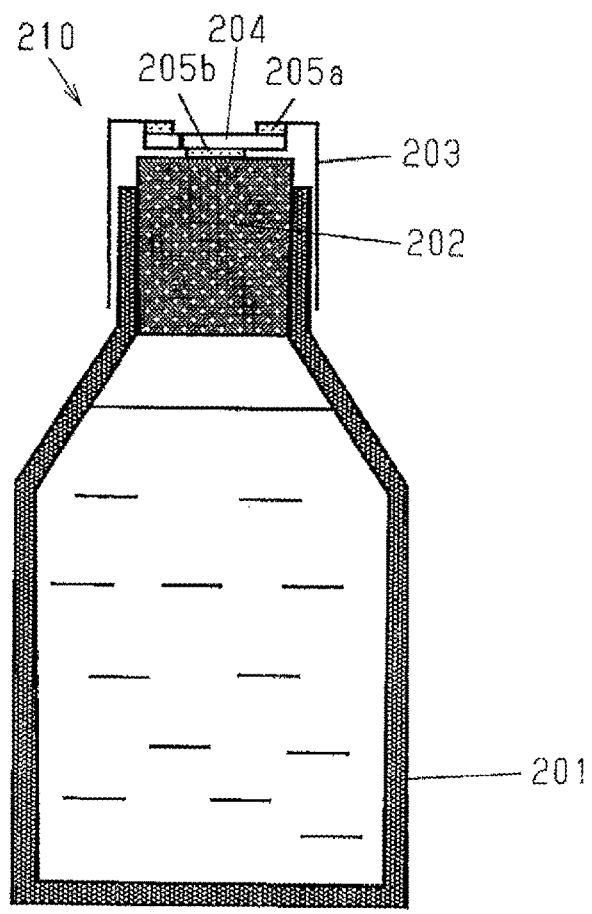
FIG. 16 is a cross-sectional view illustrating a structure of a bottle together with an IC tag label of a fourth embodiment after being applied to the bottle.
Figure 17:
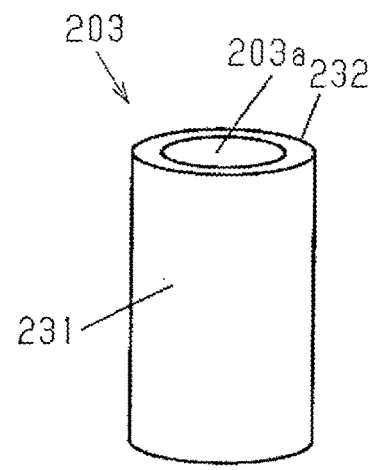
FIG. 17 is a perspective view of a capsule mounted on a bottle.
Figure 18:
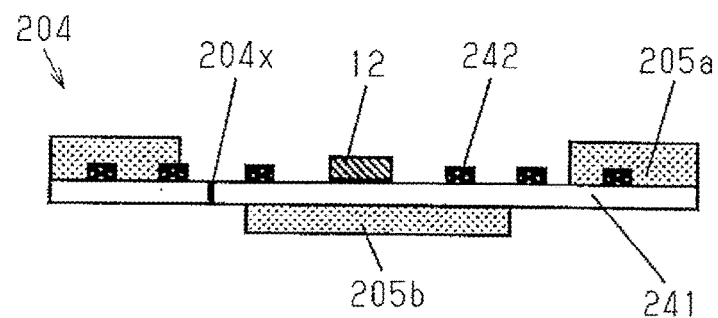
FIG. 18 is a cross-sectional view of the IC tag label of the fourth embodiment.

With reference to FIGS. 16 to 18, an IC tag label of a fourth embodiment will be described.

As shown in FIG. 16, an IC tag-labelled bottle 210 is composed of a bottle main body 201, a plug 202, a capsule 203, and an IC tag label 204. As described below, the IC tag label 204 is disposed between the plug 202 and the capsule 203, and is adhered to both the plug 202 and the capsule 203.

The bottle main body 201 is, for example, made of glass, and has a spout on the top of the bottle main body 201. The bottle main body 201 can contain alcoholic drinks such as rice wine. Further, a material for the bottle main body 201 is not limited to glass, but may also be plastic.

The plug 202 is fittingly inserted into the spout of the bottle main body 201 to thereby close the spout. Examples of the plug 202 include a cork plug and a plastic hollow plug.

As shown in FIG. 17, the capsule 203 has a bottomed cylindrical shape, and is composed of a cylindrical side wall 231 and a bottom 232. The bottom 232 is in close contact with the top of the plug 202, and covers part of the top of the plug 202. The cylindrical side wall 231 is in close contact with the side surface of the bottle main body 201 at a position adjacent to the spout, and covers the side surface. In other words, the cylindrical side wall 231 is in close contact with the outer surface of the bottle neck of the bottle main body 201, and covers the outer surface of the bottle neck. The bottom 232 has an aperture 203a formed at the center. However, the bottom 232 may not necessarily have the aperture 203a. In other words, the bottom 232 has a circular annular shape, but may also have a disc shape.

A material for the capsule 203 may be, for example, a shrink film having a cylindrical shape. That is, a bottle neck and the spout of the bottle main body 201 are inserted into a space defined by the shrink film of a cylindrical shape, and then the shrink film is heated so that the cylindrical side wall 231 shrinks and is fitted on the side surface of the bottle main body 201 at a position adjacent to the spout. Further, the bottom 232 shrinks and fitted on the outer peripheral edge of the top of the plug 202. Further, the capsule 203 is not limited to such a shrink film, and may also be formed by drawing a thin metal plate.

As shown in FIG. 18, the IC tag label 204 can be obtained by providing an antenna 242 on a sheet-shaped IC tag substrate 241, and then providing the IC chip 12 on the IC tag substrate 241 so that the antenna 242 is electrically connected to the IC chip 12. Further, in the IC tag substrate 241, a weakened score line 204x, which traverses the antenna 242 in plan view perpendicular to a plane in which the IC tag substrate 241 extends, is preferably formed to facilitate brittle fracture of the IC tag substrate 241.

The IC tag substrate 241 may be made of a plastic substrate which is made of a material such as polyethylene terephthalate (PET), polyethylene naphthalate (PEN), and polycarbonate.

The antenna 242 may be formed of a loop antenna or a dipole antenna. The antenna 242 may be, for example, formed by routing a conductive wire that is covered with an insulated film. Further, the antenna 242 may be formed by adhering a metal foil to the IC tag substrate 241 and then etching the metal foil. Alternatively, the antenna 242 may be formed by printing conductive ink onto the IC tag substrate 241.

The weakened score line 204x facilitates breakage of the IC tag substrate 241, and has a role of cancelling the function of the antenna 242 due to breakage of the IC tag substrate 241 and thus breakage of the antenna 242. In other words, the weakened score line 204x has a role of eliminating the function of the antenna 242 due to breakage of the antenna 242. Accordingly, as described above, the weakened score line 204x is preferably formed to traverse the antenna 242 in plan view perpendicular to a plane in which the IC tag substrate 241 extends. Further, from the same reason, the weakened score line 204x is preferably produced in the production process of the IC tag label 204 prior to the step of producing the antenna 242 on the IC tag substrate 241. For example, after the weakened score line 204x is formed on the IC tag substrate 241, a conductive wire covered with an insulating film or the like is routed to form the antenna 242, and then IC chip 12 is mounted on the IC tag substrate 241 to thereby obtain the IC tag label 204. The weakened score line 204x may be, for example, a perforation. Alternatively, the weakened score line 204x may be a half-cut line. The weakened score line 204x may be a straight line shape or a curved line shape in plan view perpendicular to a plane in which the IC tag substrate 241 extends.

The IC tag label 204 includes adhesive layers 205a and 205b disposed on both surfaces of the IC tag label 204 so that the IC tag label 204 is adhered to the plug 202 and the capsule 203. That is, in the IC tag substrate 241, a surface on which the antenna 242 is located is an upper surface, and a surface opposite to the upper surface is a lower surface. The IC tag label 204 is provided with an upper adhesive layer 205a on the upper surface of the IC tag substrate 241, and a lower adhesive layer 205b on the lower surface of the IC tag substrate 241. The adhesive layers 205a and 205b can be provided on the IC tag substrate 241 by applying an adhesive onto the IC tag label 204.

Further, the adhesive layers 205a and 205b are not limited to an adhesive, and may be, for example, a pressure-sensitive adhesive or a heat-sensitive adhesive, which exhibits adhesive strength when heated. When a heat-sensitive adhesive is used as the adhesive layers 205a and 205b, the adhesive layers 205a and 205b may be different heat-sensitive adhesives having different temperatures at which adhesion is performed. For example, the upper adhesive layer 205a may be a heat-sensitive adhesive having a first temperature at which adhesion is performed, and the lower adhesive layer 205b may be a heat-sensitive adhesive having a second temperature, which is lower than the first temperature, at which adhesion is performed. Further, the adhesive layers 205a and 205b may be formed by using a double-sided adhesive tape, in other words, by adhering a double-sided adhesive tape onto the IC tag substrate 241, instead of applying an adhesive or a pressure-sensitive adhesive onto the IC tag label 204.

The adhesive layers 205a and 205b may not necessarily be provided on the entire surfaces of the IC tag label 204, in other words, the IC tag substrate 241. In the present embodiment, the upper adhesive layer 205a and the lower adhesive layer 205b are each provided on part of the IC tag substrate 241.

Of these adhesive layers 205a and 205b, the upper adhesive layer 205a is provided on the upper surface of the IC tag substrate 241 as an adhesive layer to be adhered to the bottom 232 of the capsule 203. As described above, since the bottom 232 of the capsule 203 has the aperture 203a at the center, the upper adhesive layer 205a is provided on part of the IC tag substrate so that it is adhered to the bottom 232 of the capsule 203 without overlapping the aperture 203a. In other words, when the IC tag label 204 is provided between the capsule 203 and the plug 202, the upper adhesive layer 205a is located only at a position covered by the bottom 232 of the capsule 203 in the IC tag substrate 241. Further, the upper adhesive layer 205a may have an annular shape, which may be located on all or part of a portion of the IC tag substrate 241 which is covered by the bottom 232.

On the other hand, the lower adhesive layer 205b is an adhesive layer to be adhered to the plug 202, and is provided on part of the IC tag label 204 substantially at the center of the lower surface. The lower adhesive layer 205b is provided such that the weakened score line 204x is located in a region between the lower adhesive layer 205b and the upper adhesive layer 205a. In other words, in plan view perpendicular to a plane in which the IC tag substrate 241 extends, the upper adhesive layer 205a is located on the upper surface of the IC tag substrate 241 outside the lower adhesive layer 205b, and the upper adhesive layer 205a is spaced apart from the lower adhesive layer 205b. Further, in plan view perpendicular to a plane in which the IC tag substrate 241 extends, the weakened score line 204x is located between the upper adhesive layer 205a and the lower adhesive layer 205b, that is, at a position where neither the adhesive layers 205a nor 205b is located.

The IC tag label 204 with each of the adhesive layers 205a and 205b being disposed on the surface of the IC tag substrate 241 is provided on the plug 202, and then the capsule 203 is disposed thereon to adhere the plug 202 to the IC tag label 204 and adhere the IC tag label 204 to the bottom 232 of the capsule 203 to thereby obtain the IC tag-labelled bottle 210. In the case where the capsule 203 is made of a shrink film, the shrink film can be heated so that the shrink film shrinks to form the capsule 203 and adheres the plug 202 to the IC tag label 204 and adheres the IC tag label 204 to the capsule 203. Alternatively, after the capsule 203 is disposed on the IC tag label 204, the capsule 203 and the IC tag label 204 can be pressed from outside the capsule 203 so that the capsule 203 is adhered to the IC tag label 204 and the IC tag label 204 is adhered to the plug 202.

In the IC tag-labelled bottle 210 thus obtained, the spout can be opened by breaking the capsule 203 and then removing the plug 202. Further, in the IC tag-labelled bottle 210, the spout cannot be opened without breaking the capsule 203. When the capsule 203 is broken, the IC tag label 204 is broken at the weakened score line 204x, and partially remains adhered to the capsule 203 and is removed together with the capsule 203 from the bottle main body 201, and partially remains adhered to the plug 202 and is left on the plug 202. As the IC tag label 204 is broken, the antenna 242 is also broken. Accordingly, the antenna 242 also loses its antenna function. When the antenna 242 loses its antenna function, communication between the IC chip 12 and a reader/writer cannot be performed even if the IC tag label 204 which has been broken is brought close to the reader/writer. Furthermore, it is impossible to reproduce the antenna 242 to perform communication by the IC tag label 204 as if the IC tag-labelled bottle 210 has not been opened. Therefore, it is impossible to replace, for example, expensive contents such as alcoholic drinks contained in the bottle main body 201 with counterfeit inexpensive contents.

The foregoing fourth embodiment can be appropriately modified and implemented as follows.

The communication antenna 13 of the first embodiment, the communication antenna 13 of the second embodiment and the wire break detection circuit, and the communication antenna 13 of the third embodiment and the wire break detection circuit can be each applied to the antenna 242 of the fourth embodiment.

REFERENCE SIGNS LIST 10, 204: IC tag label; 10a, 51a, 52a1, 52b1: first portion 10b, 51b, 52a2, 52b2: second portion; 10c: third portion; 11: substrate; 11a: slit; 11F: front surface; 11R: rear surface; 12: IC chip; 13: communication antenna; 21, 121: front surface pattern; 22, 122, 160: rear surface pattern; 22a: first rear surface wiring end; 22b: second rear surface wiring end; 22c, 31c, 141d, 142c, 162d: annular section; 22d, 141c, 162c: folded line section; 22d1, 141c1, 162c1: bent section; 22d2, 141c2, 162c2: extended section; 31, 131: first front surface pattern; 31a, 131a: first coil end; 31b, 131b: second coil end; 31d, 131c: air core section; 31e, 142d, 162e: first linear section; 32, 132: second front surface pattern; 32a, 132a: first front surface wiring end; 32b, 132b: second front surface wiring end; 32c: arc section; 32d, 142e, 162f: second linear section; 40: wine bottle; 41: bottle main body; 41a: neck; 41a1: bottle mouth; 41ai: inner rim; 41ao: outer rim; 41b: shoulder; 41c: body; 42: cork plug; 43, 203: capsule; 51, 52: spiral section; 52a: first element; 52b: second element; 133: third front surface pattern; 133a: first front surface detection end; 133b: second front surface detection end; 134: fourth front surface pattern; 134a: third front surface detection end; 134b: fourth front surface detection end; 141, 161: first rear surface pattern; 141a, 161a: first rear surface wiring end; 141b, 161b: second rear surface wiring end; 142, 162: second rear surface pattern; 142a, 162a: first rear surface detection end; 142b, 162b: second rear surface detection end; 201: bottle main body; 202: plug; 203a: aperture; 204x: weakened score line; 205a: upper adhesive layer; 205b: lower adhesive layer; 210: IC tag-labelled bottle; 231: cylindrical side wall; 232: bottom; 241: IC tag substrate; 242: antenna; N: needle.

What is claimed is:

1. An integrated circuit (IC) tag label, comprising:
an integrated circuit (IC) chip;
a communication antenna element having a first end and a second end, the first end being electrically connected to the IC chip, the communication antenna element including a planar coil extending on a first surface and having a shape suitable for positioning on a bottle mouth; and
a bridge wiring including a wiring element which is located in an opposed region on a second surface which is opposed to the first surface, the bridge wiring electrically connecting the second end to the IC chip, wherein
the communication antenna element has an air core section which includes a center of the planar coil, and
the wiring element is a single wire including a plurality of bent sections and having a folded line shape which traverses the air core section a plurality of times in plan view perpendicular to the first surface.

2. An integrated circuit (IC) tag label, comprising:
an integrated circuit (IC) chip;
a communication antenna element having a first end and a second end, the first end being electrically connected to the IC chip, the communication antenna element including a planar coil extending on a first surface and having a shape suitable for positioning on a bottle mouth; and
a bridge wiring including a wiring element which is located in an opposed region on a second surface which is opposed to the first surface, the bridge wiring electrically connecting the second end to the IC chip, wherein
the communication antenna element has an air core section which includes a center of the planar coil, and the wiring element is a single wire having a spiral shape overlapped with the air core section in plan view perpendicular to the first surface.

3. The IC tag label of claim 1, wherein
the planar coil includes an annular section that defines the air core section, and a first linear section,
the wiring element is a second wiring element, and
the bridge wiring further includes a first wiring element located on the first surface and electrically connected to the second wiring element, the first wiring element including a second linear section, and
the first linear section and the second linear section extend outward in a radial direction of the annular section from different positions in a circumferential direction of the annular section and are located on a single straight line in plan view perpendicular to the first surface.

4. The IC tag label of claim 1, wherein
the planar coil includes an annular section that defines the air core section, and
the planar coil has a size such that, when positioned on the bottle mouth, one-half or more of a circumferential length of the annular section is located inside an outer rim of the bottle mouth in plan view perpendicular to the first surface.

5. The IC tag label of claim 1, wherein
the IC chip is located inside an outer rim of the bottle mouth on the first surface when the planar coil is positioned on the bottle mouth,
the wiring element is a second wiring element,
the bridge wiring further includes a first wiring element located on the first surface and including a third end electrically connected to the IC chip and a fourth end electrically connected to the second wiring element,
the second end has a maximum line width in the planar coil,
the fourth end has a maximum line width in the first wiring element, and
when the planar coil is positioned on the bottle mouth, the second end and the fourth end are located between an inner rim and an outer rim of the bottle mouth in plan view perpendicular to the first surface.

6. An integrated circuit (IC) tag label, comprising:
an integrated circuit (IC) chip;
a communication antenna element having a first end and a second end, the first end being electrically connected to the IC chip, the communication antenna including a planar coil extending on a first surface and having a shape suitable for positioning on a bottle mouth; and
a bridge wiring electrically connecting the second end to the IC chip; and
a wire break detection circuit including a detection element located outside the planar coil in plan view perpendicular to the first surface, and electrically connected to the IC chip, the detection element having a shape suitable for positioning on the bottle neck, wherein
the communication antenna element has an air core section which includes a center of the planar coil,
one of the bridge wiring and the wire break detection circuit includes a single wire,
the single wire includes a plurality of bent sections and having a folded line shape which traverses the air core section a plurality of times in plan view perpendicular to the first surface,
the single wire is located on an opposed region on a second surface which is opposed to the first surface when the bridge wiring includes the single wire, and
the single wire is located on one of the first surface and the opposed region when the wire break detection circuit includes the single wire.

7. An integrated circuit (IC) tag label, comprising:
an integrated circuit (IC) chip;
a communication antenna element having a first end and a second end, the first end being electrically connected to the IC chip, the communication antenna including a planar coil extending on a first surface and having a shape suitable for positioning on a bottle mouth; and
a bridge wiring electrically connecting the second end to the IC chip; and
a wire break detection circuit including a detection element located outside the planar coil in plan view perpendicular to the first surface, and electrically connected to the IC chip, the detection element having a shape suitable for positioning on the bottle neck, wherein
the communication antenna element has an air core section which includes a center of the planar coil,
one of the bridge wiring and the wire break detection circuit includes a single wire,
the single wire has a spiral shape overlapped with the air core section in plan view perpendicular to the first surface,
the single wire is located on an opposed region on a second surface which is opposed to the first surface when the bridge wiring includes the single wire, and
the single wire is located on one of the first surface and the opposed region when the wire break detection circuit includes the single wire.

8. The IC tag label of claim 1, wherein at least part of the plurality of bent sections is located outside the air core section.

9. The IC tag label of claim 8, wherein
the single wire includes a plurality of extended sections, each of which is connected to an adjacent extended section via the bent section, and
a sum of a distance between two adjacent extended sections and line widths of the two extended sections is in a range of 0.225 mm or more and 3 mm or less.

10. The IC tag label of claim 6, wherein
the detection element includes a first linear section and a second linear section, and
the first linear section and the second linear section extend outward in a radial direction of the planar coil from different positions in a circumferential direction of the planar coil and are located on a single straight line in plan view perpendicular to the first surface.

11. The IC tag label of claim 6, wherein the planar coil has a size such that, when positioned on the bottle mouth, one-half or more of a circumferential length of the planar coil is located inside an outer rim of the bottle mouth in plan view perpendicular to the first surface.

12. The IC tag label of claim 6, wherein
the IC chip is located inside an outer rim of the bottle mouth on the first surface when the planar coil is positioned on the bottle mouth,
the bridge wiring further includes a wiring element located on the first surface and including a third end and a fourth end electrically connected to the IC chip,
the second end has a maximum line width in the planar coil,
the fourth end has a maximum line width in the wiring element, and
when the planar coil is positioned on the bottle mouth, the second end and the fourth end are located between an inner rim and an outer rim of the bottle mouth in plan view perpendicular to the first surface.

* * * * *